(12) United States Patent
Kesavadas et al.

(10) Patent No.: US 9,595,207 B2
(45) Date of Patent: Mar. 14, 2017

(54) METHOD AND SYSTEM FOR MINIMALLY-INVASIVE SURGERY TRAINING USING TRACKING DATA

(75) Inventors: Thenkurussi Kesavadas, Clarence Center, NY (US); Khurshid Guru, East Amherst, NY (US)

(73) Assignees: Health Research, Inc., Buffalo, NY (US); The Research Foundation for The State University of New York, Amherst, NY (US)

( * ) Notice: Subject to any disclaimer, the term of this patent is extended or adjusted under 35 U.S.C. 154(b) by 791 days.

(21) Appl. No.: 13/806,891

(22) PCT Filed: May 26, 2011

(86) PCT No.: PCT/US2011/038209
§ 371 (c)(1),
(2), (4) Date: Jul. 23, 2013

(87) PCT Pub. No.: WO2011/150257
PCT Pub. Date: Dec. 1, 2011

(65) Prior Publication Data
US 2013/0295540 A1 Nov. 7, 2013

Related U.S. Application Data

(60) Provisional application No. 61/348,732, filed on May 26, 2010.

(51) Int. Cl.
G09B 23/28 (2006.01)

(52) U.S. Cl.
CPC .................... *G09B 23/28* (2013.01)

(58) Field of Classification Search
CPC .................. G09B 23/28; G09B 23/285; A61B 2019/2223
See application file for complete search history.

(56) References Cited

U.S. PATENT DOCUMENTS

2006/0178559 A1* 8/2006 Kumar ................... A61B 19/22
600/109
2007/0167702 A1 7/2007 Hasser
(Continued)

OTHER PUBLICATIONS

Reiley et al., Effect of visual force feedback on robot-assisted surgical task performance, Journal of Thoracic and Cardiovascular Surgery, vol. 135, No. 1, pp. 196-202. Jan. 5, 2008.
(Continued)

*Primary Examiner* — Timothy A Musselman
(74) *Attorney, Agent, or Firm* — Hodgson Russ LLP

(57) ABSTRACT

A system and method for training a person in minimally-invasive surgery ("MIS") utilizing a video of the MIS. The system comprises a processor, a display, and a first interaction device. The processor programmed to receive the video and to obtain tracking data. The tracking data may correspond to the motion of a tool controller. The tracking data may correspond to motion of a first surgical tool in the video. The processor programmed to calculate motion of the first interaction device corresponding to the tracking data, to display the video, and to cause the first interaction device to move according to the calculated motion. The method comprises receiving the video, obtaining the tracking data, calculating a motion of a first interaction device corresponding to the tracking data, displaying the video, and causing the first interaction device to move according to the calculated motion.

19 Claims, 14 Drawing Sheets

(56) References Cited

U.S. PATENT DOCUMENTS

2009/0036902 A1    2/2009  DiMaio
2009/0177452 A1*  7/2009  Ullrich et al. .................. 703/11
2010/0167248 A1*  7/2010  Ryan ............................. 434/262

OTHER PUBLICATIONS

Loi-Wah Sun et al., Design and Development of a Da Vinci Surgical System Simulator, Mechatronics and Automation, 2007, pp. 1050-1055. Aug. 5, 2007.

Pezzementi et al., Articulated object tracking by rendering consistent appearance parts, 2009 IEEE International Conferenec on Robotics and Automation, pp. 3940-3947. May 12, 2009.

Konrad et al., "3.10 Motion Detection and Estimation; 4.11 2D and 3D Motion Tracking in Digital Video", Handbook of Image and Video Processing, pp. 283-274, 491. Jan. 1, 2005.

* cited by examiner

METHOD AND SYSTEM FOR MINIMALLY-INVASIVE SURGERY TRAINING USING TRACKING DATA

CROSS-REFERENCE TO RELATED APPLICATION

This application claims the benefit of priority to U.S. provisional patent application Ser. No. 61/348,732, filed May 26, 2010, the disclosure of which is incorporated herein by reference.

FIELD OF THE INVENTION

The invention relates to surgical training, and more particularly to training a person in performing minimally-invasive surgical procedures.

BACKGROUND OF THE INVENTION

Minimally invasive surgery ("MIS") has been accepted as a useful alternative to open surgery for many health conditions. While safer for the patient, MIS poses a number of unique challenges to the surgeon performing them. The challenges fall into two broad domains: (i) the cognitive domain, wherein the surgeon uses knowledge and prior experience to make decisions regarding the procedure; and (ii) the motor control domain, where the surgeon uses physical skills to carry out specific decisions made through their cognitive process. For example, in laparoscopic surgery, a type of MIS, the surgery is conducted through small incisions made in the thorax or the abdomen of the body. Since the surgery takes place inside the closed volume of the human body, a small flexible camera called an endoscope is inserted inside the body to provide visual feedback. This set up gives rise to a number of cognitive challenges that make this form of surgery especially challenging, including:

(1) lack of visual feedback—the visual feedback is provided by images captured through the endoscope and displayed on a screen, lacking depth information;

(2) poor image quality—since the procedure is carried out within closed body cavities, the images received from the endoscope are affected by a number of factors, including improper lighting, smoke from cauterization of tissue and lensing effects;

(3) landmarks—Unlike open surgery, anatomical landmarks are not readily discernible and it is difficult to get oriented and navigate correctly inside the body without making mistakes; and (4) patient differences—pathology and individual variations in physiology create visual differences in two bodies, this effect is amplified in MIS.

Some ramifications of the above described problems result in making the cognitive process of the surgeons exceedingly difficult. It is for the same reasons residents require extensive training with a number of procedures before they can graduate to performing surgery on their own.

Currently available simulators may train surgical residents for motor skill improvement. However, the current training methods do not adequately address the issue of improving the cognitive ability of the resident. Therefore, a resident typically gets acquainted with identifying anatomical landmarks by watching actual surgeries and training under a surgeon. This makes the learning curve slow, difficult, and expensive.

Accordingly, there is a need for an MIS training method and system that better prepares the operator by improving both the motor skills and the cognitive skills of the trainer.

BRIEF SUMMARY OF THE INVENTION

The currently disclosed training method and simulator may be used to enhance a trainee's motor learning while also teaching the steps of a surgical procedure. A method and system according to the present invention allows a trainee to watch a video of an MIS procedure while the trainees hand(s) are guided by an interaction device so that the trainee's hands moves in the same way as the hands of the surgeon who performed the surgery.

The present invention may be embodied as a system for training a person to perform minimally-invasive surgery ("MIS"). The training utilizes a video of an MIS. The system comprises a processor. The system has a display in communication with the processor. The system further comprises a first interaction device in communication with the processor. The processor is programmed to receive the video of the MIS. The processor is also programmed to obtain the tracking data. The tracking data may correspond to the motion of a tool controller controlled by a surgeon who performed the MIS of the video. In another embodiment, the tracking data may correspond to motion of the first surgical tool in the video. The processor may obtain the tracking data by processing the video to calculate motion of the first surgical tool.

The processor is programmed to calculate motion of the first interaction device corresponding to the tracking data. The processor is programmed to display the video on the display. The processor is programmed to cause the first interaction device to move according to the calculated motion. In this way, a trainee grasping or observing the first interaction device may experience motor learning. The system may have a second interaction device.

The present invention may be embodied as a method comprising the steps of receiving the video, obtaining the tracking data, calculating a motion of a first interaction device corresponding to the tracking data, displaying the video on the display, and causing the first interaction device to move according to the calculated motion.

The present invention may be embodied as a computer program for performing any of the methods described herein. The computer program may be embodied on a computer readable medium. The computer readable medium may be a computer network or a storage location (e.g., server, NAS, SAN, etc) attached to a computer network.

DESCRIPTION OF THE DRAWINGS

For a fuller understanding of the nature and objects of the invention, reference should be made to the following detailed description taken in conjunction with the accompanying drawings, in which.

DETAILED DESCRIPTION OF THE INVENTION

Figure 1A:
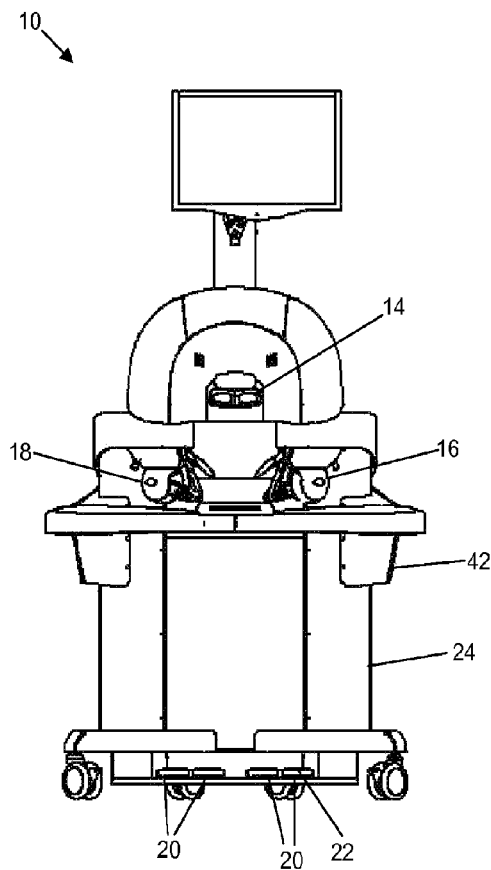
FIG. 1A is a front view of an MIS system according to an embodiment of the present invention.

The present invention may be embodied as a system 10 for training a person to perform minimally-invasive surgery ("MIS"). The training utilizes a video of an MIS performed by a surgeon. In embodiments of the invention, the video is not part of the system 10, but is captured separately from the system 10. The video may be pre-recorded on storage media (e.g., tape, disc, hard-drive, flash drive, etc.) as is known in the art, or the video may be a live video of a surgery being performed in real time. The video comprises a plurality of frames, where each frame is an image at a point in time. The video may be a stereoscopic video, captured from two points-of-view in fixed relation to each other. In an example, the video may show a prostatectomy using a da Vinci® Surgical System ("DVSS"), where one of the robot's tools is visible. Such tools may include, but are not limited to, a scalpel, scissors, or bovie. In another example, the video may show a conventional (non-robotic) laparoscopic procedure. Other videos of suitable MIS procedures will be apparent to those having skill in the art.

In the video, a first surgical tool is visible. The first surgical tool may be performing tasks such as, for example, grasping, suturing, cauterizing, etc. The first surgical tool is operated by the surgeon using a first tool controller. Such a first tool controller may be, in a non-limiting example, the master of a DVSS. Here again, the first tool controller is not a part of the system 10, but is used separately during the surgery shown in the video. In some embodiments of the present invention, motion of the first tool controller is captured as tracking data. The motion includes, in a non-limiting example, position, orientation, and end-effector operation. In a particular example, the motion captured by tracking data includes the position and orientation of each joint and/or segment of the tool controller over time. In another example, the motion includes the position and orientation of the distal end of the tool controller over time. Other forms of capturing the motion of the tool controller as tracking data will be apparent to those having skill in the art. In such embodiments, the first tool controller motion is captured over a duration of time corresponding to the time of the video. In this way, the tracking data is synchronized with the video. As such, the movement of the surgeon's hand may be captured vis-à-vis the tracking data of the motion of the first tool controller. In such embodiments, capturing the motion of the tool controller as tracking data does not necessarily make up a part of the present system or method.

The system 10 comprises a processor 24. The processor may be, for example, a computer or a controller. The system 10 has a display 14 in communication with the processor 24. The processor 24 is capable of displaying the video on the display 14. The display 14 may be an LCD monitor commonly used with computers, a head-mounted (wearable) display, a projector, or any type of device capable of displaying a video to a person.

In the embodiment where the video is a stereoscopic video, the display 14 may also be a stereoscopic display capable of showing each view of the video separately to each eye of the trainee. In this way, a three-dimensional representation is reconstructed from two two-dimensional images/videos. This type of three-dimensional construction is often referred to as 2.5-dimensional (two-and-a-half dimensional). Three dimensional and 2.5 dimensional may be used interchangeably in this disclosure. A stereoscopic display may have two display devices, or may make use of wearable glasses configured to cause each view of the video to be displayed to each eye of the wearer. Other stereoscopic display technologies are known in the art and may be used as part of the present invention.

The system 10 further comprises a first interaction device 16 in communication with the processor 24. The first interaction device 16 may be, for example, a PHANTOM® Omni® device. The first interaction device 16 is capable of motion according to instructions received by the first interaction device 16 from the processor 24. For the purposes of this disclosure, "movement" or "motion" means that the first interaction device 16 is capable of independent motion unguided by a user and/or "movement" or "motion" means that the first interaction device 16 is capable of being moved by a user and the first interaction device guiding (moving) the user's hand (i.e., restricting the user's motion) through haptic feedback.

The processor 24 is programmed to receive the video of the MIS. As such, the processor 24 may receive the video from a storage location in a memory device, from a network location, or elsewhere. The video may be received as a live stream from a network location or pre-recorded and stored. The video may be of any format capable of being processed by a processor as is known in the art. For example, the video may be an AVI, MPEG, WMV, etc. The processor 24 may receive the video by first requesting the video from another device, by receiving the video sent without a request, or otherwise.

The processor 24 is also programmed to obtain the tracking data. In the aforementioned embodiment where the tracking data corresponds to the motion of the tool controller, the processor 24 may obtain the tracking data by receiving the tracking data. The processor 24 may receive the video by first requesting the video from another device, by receiving a video sent without a request, or otherwise. The tracking data may be co-located with the video or in another location.

In another embodiment of the present invention, the tracking data may correspond to motion of the first surgical tool in the video. Tracking data corresponding to motion of the first surgical tool may be determined in a manual process by a person viewing the video and recording the motion of the first surgical tool (e.g., position of the end-effector, or other representative motion) as tracking data. The person may record this as, for example, a data file. In such embodiments, the tracking data may be obtained by the processor 24 by receiving the tracking data.

In another embodiment of the present invention where the tracking data corresponds to motion of the first surgical tool in the video, the processor 24 may obtain the tracking data by processing the video to calculate motion of the first surgical tool. This process is further described below ("Automated Tool Position Determination").

The processor 24 is programmed to calculate motion of the first interaction device 16 corresponding to the tracking data. In embodiments where the tracking data corresponds to the motion of the first tool controller, such tool controller motion is mapped to a corresponding motion of the first interaction device 16. The mapping parameters are predetermined and further described in an exemplary embodiment ("Workspace Mapping" below). The mapping parameters may be created such that the motion of the first tool controller has any relationship to the motion of the first interaction device 16. In a preferred embodiment, the mapping parameters are created such that movement of the first interaction device 16 causes a hand of a trainee grasping the first interaction device 16 to re-create the movement of the surgeon's hand (moving the first tool controller). In this way, the trainee may experience motor learning.

In embodiments where the tracking data corresponds to the calculated motion of the first surgical tool, such surgical tool motion is mapped to a corresponding motion of the first interaction device 16. The mapping parameters are predetermined and further described in an exemplary embodiment ("Inverse Kinematics Mapping" below).

The processor 24 is programmed to display 14 the video of the MIS on the display. The processor 24 is programmed to cause the first interaction device 16 to move according to the calculated motion. The motion of the first interaction device 16 may be such that the first interaction device 16 moves affirmatively (the first interaction device 16 moves on its own, such as with a robotic arm). Alternatively, the motion of the first interaction device 16 may take the form of restriction of movements of a trainee (user) by way of haptic feedback. In this way, a trainee grasping the first interaction device 16 will be restricted to moving the first interaction device 16 in the appropriate motion.

A signal provided by the processor 24 to the first interaction device 16 may cause the first interaction device 16 to create the movements necessary to accomplish (mimic) the tool controller movement. For example, if the tracking data captured movement of the first controller from left to right (and the corresponding left-to-right movement of the first surgical tool in the video), the processor 24 would provide a signal to the first interaction device 16 moving the first interaction device 16 from left to right. In this way, a user of the system 10, holding the first interaction device 16, would feel the first interaction device 16 moving as needed to create the surgical tool movements on the display (and moving the users hand in the same way). The necessary signal may be calculated based on the tracking data captured during the original MIS, or calculated based on the first surgical tool position in the video.

The master console of an actual surgical robot or a simulator may be used as the system 10 of the present invention to "playback" a surgical procedure through video and interaction device movement allowing a trainee to see (through the video on the display) and feel (through the movement of the interaction device) the surgical procedure. This technique could be used at a tandem console during a live surgical procedure. In a non-limiting example, while a surgeon is performing an MIS, a tandem console may be used as a system 10 of the present invention to recreate the surgeon's movements for a student to see and feel.

Figure 1B:
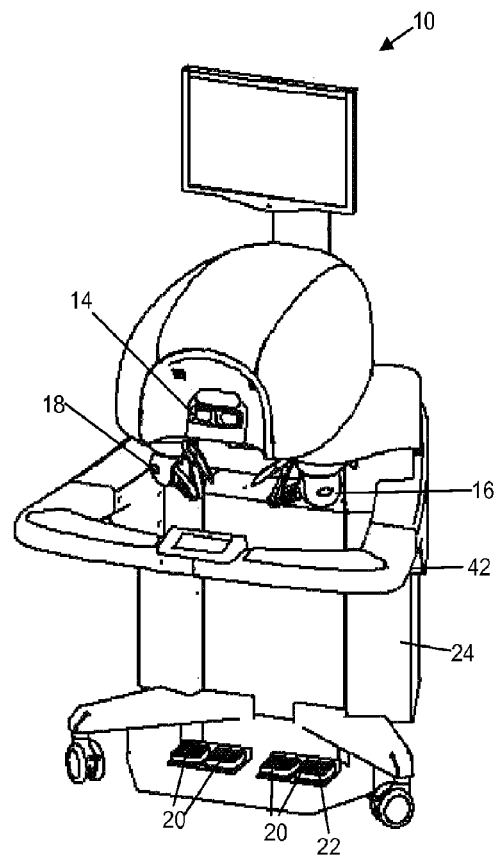
FIG. 1B is a perspective view of the MIS simulator of FIG. 1A.
Figure 2A:
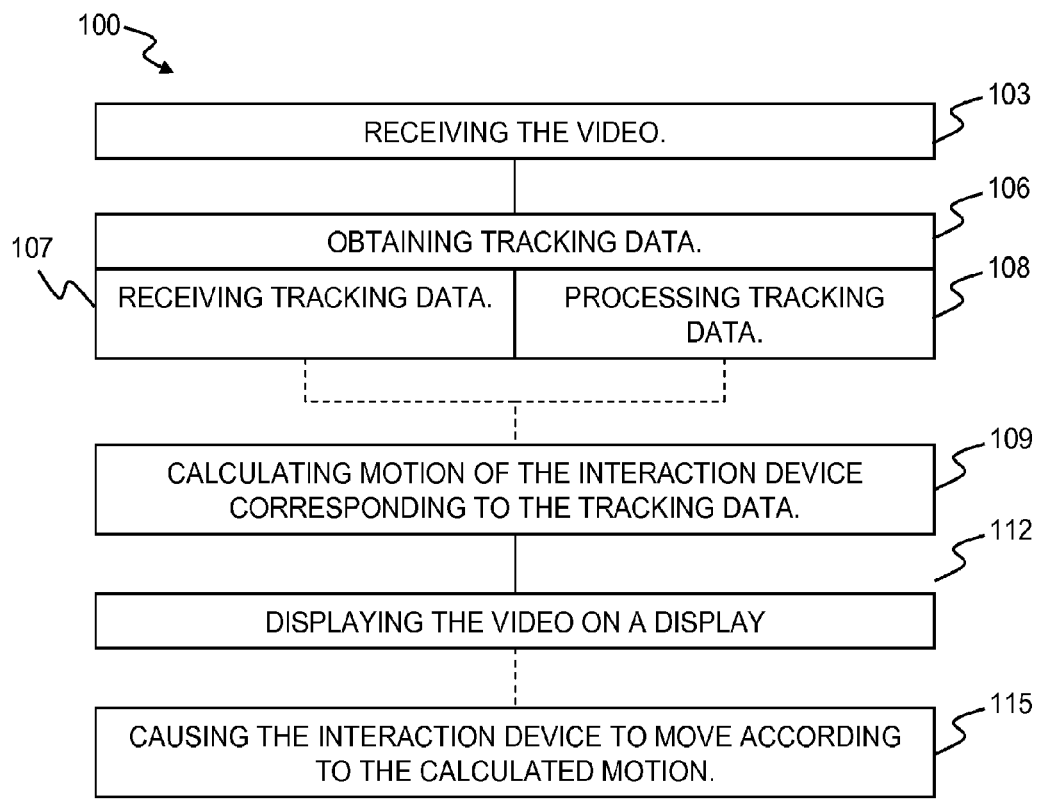
FIG. 2A is a flowchart of depicting a method according to another embodiment the present invention.
Figure 2B:
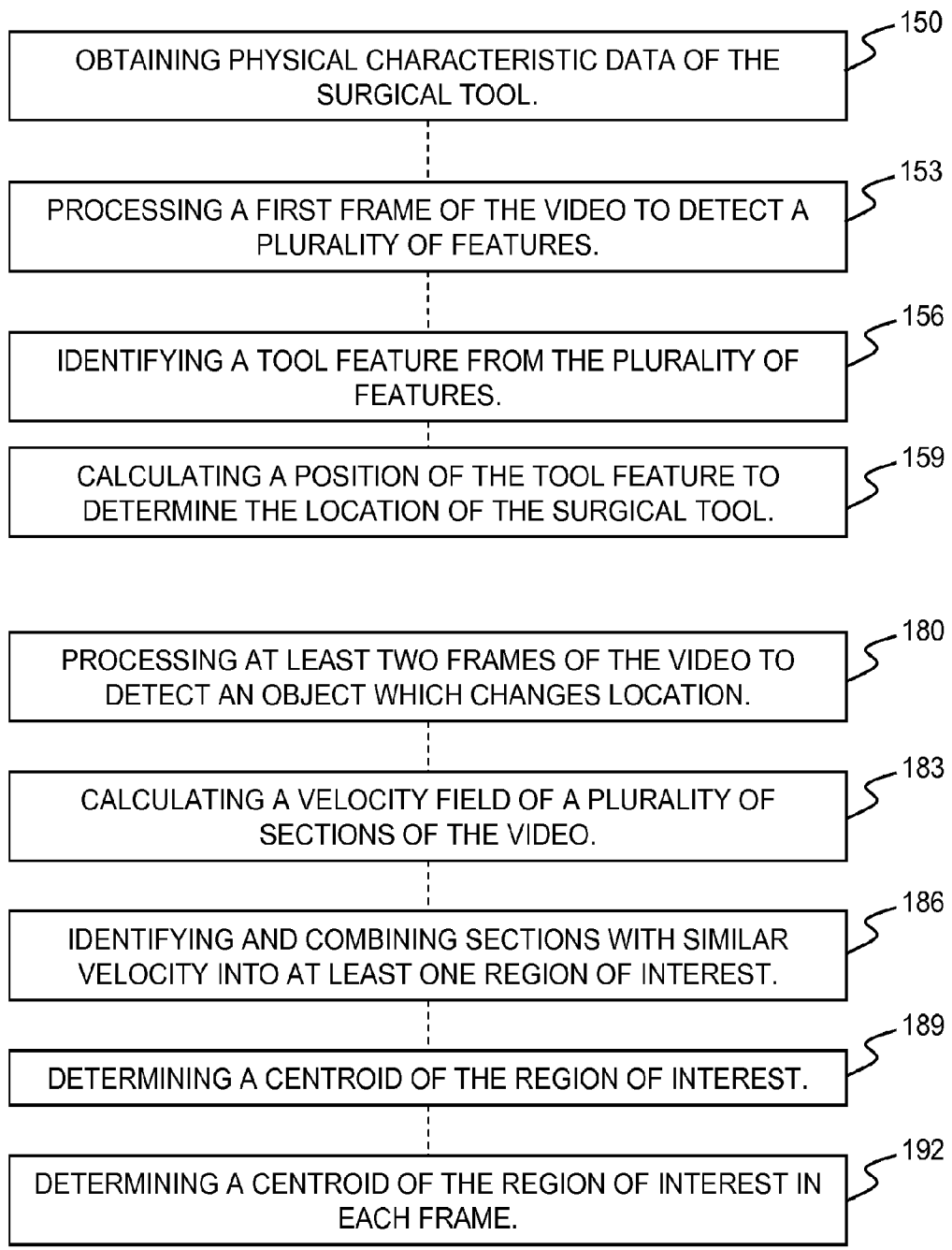
FIG. 2B is a flowchart of depicting other methods according to embodiments the present invention.

In another embodiment, the system 10 has a second interaction device 20. For example, in systems intended to train a trainee to perform robot-assisted surgery, a second interaction device is used to emulate a second tool controller of the surgical robot master. In this way, a surgeon uses two hands to control two tool controllers. One example of a suitable system 10, the Robotic Surgical Simulator ("RoSS™") from Simulated Surgical Systems LLC, is depicted in FIG. 1, although it should be understood that other simulators may be used. Additional interaction devices may be used as necessary to accommodate additional tool controllers.

In another embodiment, the video and tracking data is of a surgeon performing a procedure using a simulator. In such embodiments, a trainer may use a simulator to perform procedures and establish training routines for a trainee to replay. The trainer may perform simulated surgeries or other training tasks, such as, but not limited to, so-called pick-and-place tasks. In another alternative, the trainer may be using a simulator at the same time as a trainee is using a system of the present invention.

Force Feedback

In embodiments where the tracking data corresponds to motion of the tool controller(s) by the surgeon, forces encountered by the actual surgical tools during the MIS may be captured within the tracking data and synchronized to the video. Such force data may be utilized by a system of the present invention to playback the forces through the haptic feedback of the interaction device. In this way, tissue structures and other sensation may be experienced in the virtual surgical space using the interaction device. For example, when the MIS is performed with a surgical robot, forces encountered by the robot slave may be recorded at the joints of the slave. Such haptic feedback is considered within the meaning of movement (see above, restricting the movement of a user's hand), and within the scope of the present invention.

Visual Feedback

Figure 11:
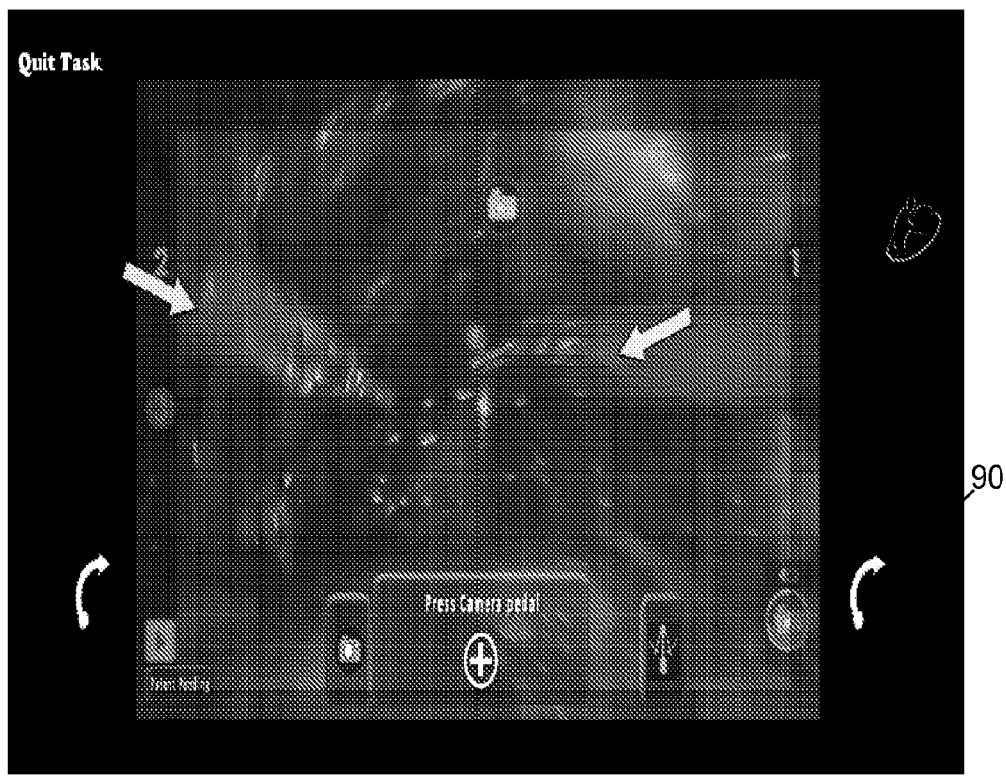
FIG. 11 is an image showing a visual cue.
Figure 12:
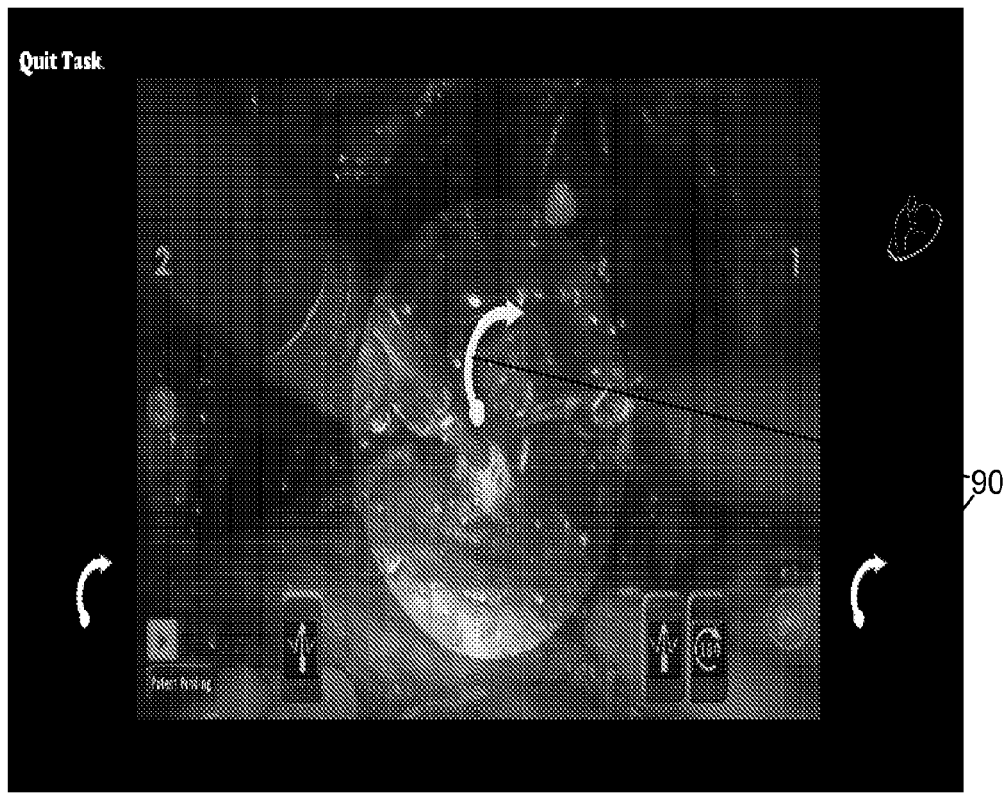
FIG. 12 is an image showing another visual cue.
Figure 13:
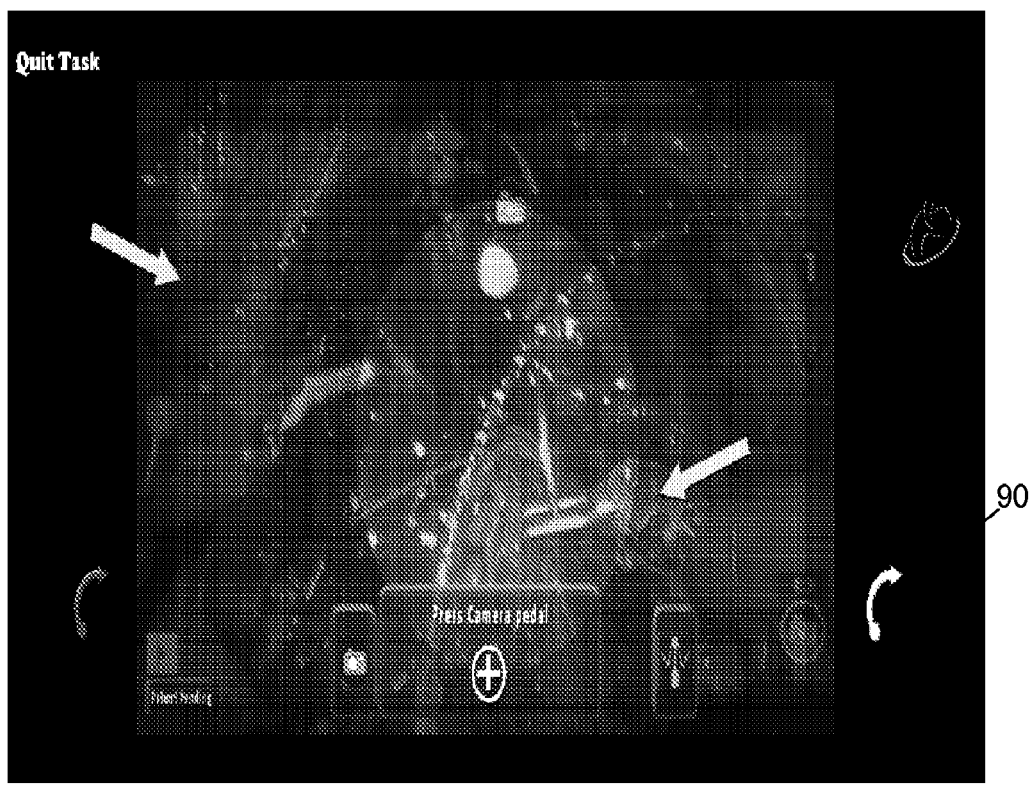
FIG. 13 is an image showing another visual cue.

In embodiments of the present invention, the first interaction device 16 has the same number of degrees of freedom as the first tool controller. In other embodiments, the first interaction device 16 has fewer degrees of freedom than the first tool controller. In still other embodiments, the first interaction device 16 may have degrees of freedom not capable of inducing a force. Using a non-limiting example of a simple joystick as an interaction device, the joystick may be capable of three degrees of freedom—two translation (x and y) and one rotational (rotating the joystick along its longitudinal axis). Such a joystick may be capable of inducing a force in the translational degrees of freedom (i.e., the joystick may be able to move up, down, left, and right independent of a user). However, the joystick may not be capable of inducing a force to rotate about the longitudinal axis. In such embodiments, where the first interaction device 16 has fewer degrees of freedom or degrees of freedom not capable of inducing a force, cues may be presented to the trainee to move the first interaction device 16 in an appropriate way. Such cues may be visual, audible, tactile, or any other mode capable of prompting the trainee. Using the joystick example above, the trainee can be prompted with a visual cue, such as an arrow on the display, to rotate the joystick about its longitudinal axis. FIGS. 11, 12, 13, depict another example involving an MIS simulator where the trainee is prompted by an arrow 90 to rotate the first interaction device 16 appropriately.

A method 100 according to an embodiment of the present invention is used to train an individual in performing MIS. The training utilizes a video of an MIS performed by a surgeon. In embodiments of the invention, the video itself and capturing the video are not a part of the method. The video may be pre-recorded on storage media (e.g., tape, disc, hard-drive, flash drive, etc.) as is known in the art, or the video may be a live video of a surgery being performed in real time. The video comprises a plurality of frames, where each frame is an image at a point in time. The video may be a stereoscopic video, captured from two points-of-view in fixed relation to each other. In an example, the video may show a prostatectomy using a DVSS, where one of the robot's tools is visible. Such tools may include, but are not limited to, a scalpel, scissors, or bovie. In another example, the video may show a conventional (non-robotic) laparoscopic procedure. Other videos of suitable MIS procedures will be apparent to those having skill in the art.

In the video, a first surgical tool is visible. The first surgical tool may be performing tasks such as, for example, grasping, suturing, cauterizing, etc. The first surgical tool is operated by the surgeon using a first tool controller. Such a first tool controller may be, in a non-limiting example, the master of a DVSS. Here again, use of the first tool controller is not a step of the method, but is used separately during the surgery shown in the video. In some embodiments of the present invention, motion of the first tool controller is captured as tracking data. The motion includes, in a non-limiting example, position, orientation, and end-effector operation. In such embodiments, the first tool controller motion is captured over a duration of time corresponding to the time of the video. In this way, the tracking data is synchronized with the video. As such, the movement of the surgeon's hand may be captured vis-à-vis the tracking data of the motion of the first tool controller.

A method 100 of the present invention comprises the step of receiving 103 the video. As such, the video may be received 103 from a storage location in a memory device, from a network location, or elsewhere. The video may be received 103 as a live stream (e.g., from a network location, etc.) or pre-recorded and stored. The video may be of any format capable of being processed by a computer as is known in the art. For example, the video may be an AVI, MPEG, WMV, etc. The video may be received 103 by first requesting the video from another device, by receiving the video sent without a request, or otherwise.

The method comprises the step of obtaining 106 the tracking data. In the aforementioned embodiment where the tracking data corresponds to the motion of the tool controller, the tracking data may be obtained by receiving 107 the tracking data. The tracking data may be received 107 by first requesting the video from another device, by receiving the video without a request, or otherwise. The tracking data may be co-located with the video or in another location.

In another embodiment of the present invention, the tracking data may correspond to motion of the first surgical tool in the video. Tracking data corresponding to motion of the first surgical tool may be determined by a manual process (separate from the method of the present invention) by a person viewing the video and recording the motion of the first surgical tool (e.g., position of the end-effector, or other representative motion) as tracking data. The person may record this as, for example, a data file. In such embodiments, the tracking data may be obtained 106 by receiving 107 the tracking data.

In another embodiment of the present invention where the tracking data corresponds to motion of the first surgical tool in the video, the tracking data may be obtained 106 by processing 108 the video to calculate motion of the first surgical tool. This process is further described below ("Automated Tool Position Determination"), although other methods of mapping are known in the art.

The method 100 comprises the step of calculating 109 a motion of a first interaction device corresponding to the tracking data. In embodiments where the tracking data corresponds to the motion of the first tool controller, such tool controller motion is calculated 109 by mapping to a corresponding motion of the first interaction device. The mapping parameters are pre-determined and further described in an exemplary embodiment ("Workspace Mapping" below). The mapping parameters may be created such that the motion of the first tool controller has any desired relationship to the motion of the first interaction device. In a preferred embodiment, the mapping parameters are created such that movement of the first interaction device causes a hand of a trainee grasping the first interaction device to re-create the movement of the surgeon's hand.

In embodiments where the tracking data corresponds to the calculated motion of the first surgical tool, such surgical tool motion is calculated 109 by mapping to a corresponding motion of the first interaction device. The mapping parameters are pre-determined and further described in an exemplary embodiment ("Inverse Kinematics Mapping" below), although other methods of mapping are know in the art.

The method 100 comprises the step of displaying 112 the video on the display. The method 100 comprises causing 115 the first interaction device to move according to the calculated motion. The motion of the first interaction device may be such that the first interaction device moves affirmatively (the first interaction device moves on its own, such as with a robotic arm). Alternatively, the motion of the first interaction device may take the form of restriction of movements of a trainee (user) by way of haptic feedback. In this way, a trainee grasping the first interaction device will be restricted to moving the first interaction device in the appropriate motion.

The present invention may be embodied as a computer program for performing any of the methods described herein. The computer program may be embodied on a computer readable medium. The computer readable medium may be a computer network or a storage location (e.g., server, NAS, SAN, etc) attached to a computer network.

Non-Surgical Embodiments

A system and/or method of other embodiments of the present invention are capable of, and configured for, training a trainee in the use of other equipment where the equipment is controlled through movement of a user's body. Such equipment may be referred to as remotely operated in that the operator uses a proxy (e.g., a joystick, lever, pedal, etc.) to operate the equipment. Remotely operated does not necessarily mean, and should not be interpreted to require, that the operator is located at a particular distance from the equipment. For example, the system may be configured to train a trainee to operate construction equipment, such as, for example, a crane, a front-loader, a back-hoe, etc. Such equipment is generally operated by a person using joysticks or other levers. Other systems may be configured to train in the use of an industrial robot, a welder, an automobile, an airplane, etc. In certain embodiments, interaction devices may interface with a trainee's hand, foot, or other body parts. For example, in an automobile training system, an interaction device may be usable by a trainee's foot to simulate an accelerator pedal, brake pedal, or clutch pedal.

In these non-surgical embodiments, a system for training a trainee uses a video showing the equipment (the subject of the training) from the point of view of an actual operator. For example, in a system for training a trainee to operate a crane, the video will show the crane from the point of view of a crane operator. The video shows the equipment in use to perform one or more functions. In the crane example, the crane may be shown picking up materials. The operator uses the controls the equipment by way of a first tool controller. Depending on the particular use, two or more tool controllers may be used. For example, a plurality of levers may be necessary to operate the crane of the previous example.

Similar to the aforementioned MIS embodiments, the system has a processor, a display in communication with the processor, and a first interaction device in communication with the processor. There may be more than one interaction device corresponding with the number of tool controllers. In other embodiments, there may be fewer interaction devices than tool controllers. In these embodiments, the interaction device(s) may be switchable such that the first interaction device can switch from simulating a first tool controller to simulating a second tool controller, and so on. As such, the system may further comprise a switch 22 for switching the first interaction device (or other interaction device) to simulate each of two or more tool controllers. The switch 22 may be a push-button, a throw switch, a lever, a foot pedal, or any other switching device commonly known in the art.

The processor is programmed to receive the video. The processor is programmed to obtain the tracking data. The tracking data may be obtained as described above—corresponding to movement of the tool controller, or corresponding to movement of the equipment in the video (determined manually or automatically). The processor calculates a motion of the first interaction device which corresponds to the tracking data. The processor displays the video on the display and causes the first interaction device to move according to the calculated motion. In this way, a trainee using a system of the present invention will be able to experience the visuals and motions of the operator of the physical equipment.

Workspace Mapping Example

In the following example, intended to be non-limiting, a tool controller, in the form of a DVSS master input device, was kinematically modeled and mapped to an interaction device, in the form of a PHANTOM® Omni® device. In this example, the PHANTOM® Omni® was mounted in an inverted configuration as found in a RoSS™ device from Simulated Surgical System LLC.

Figure 14A:
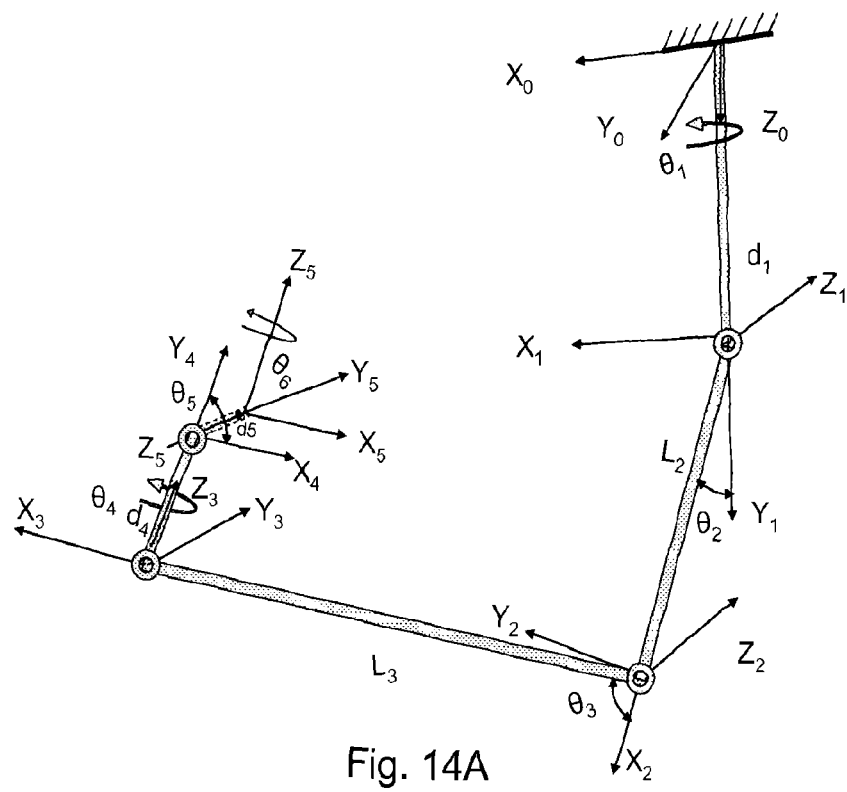
FIG. 14A is a line diagram of the DVSS master input device.
Figure 14B:
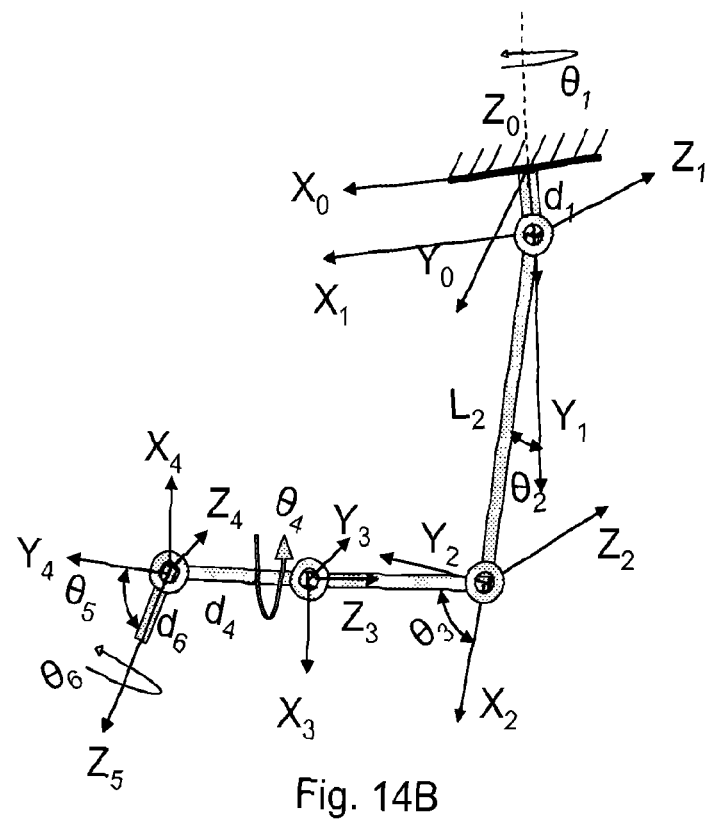
FIG. 14B is a line diagram of the RoSS input device.

FIG. 14A depicts a line diagram of the DVSS master input device; FIG. 14B depicts a line diagram of the RoSS input device. The DVSS input device may be viewed as an arm and a wrist. The arm of the DVSS input device has three degrees of freedom and comprise a shoulder and an elbow—the shoulder having two degrees of freedom, and the elbow having one degree of freedom. The five degrees of freedom of the wrist of the DVSS input device were collapsed and mapped to three degrees of freedom of the interaction device. Due to the redundant degrees of freedom of the wrist of the DVSS, the five degrees of freedom can be collapsed to 3 degrees of freedom. The roll motion of the wrist of the master was mapped to the roll motion of the wrist of the RoSS. The yaw motion of the jaws of the wrist of the DVSS was mapped to the yaw motion of the end effector of the RoSS, and the clasping of jaws was mapped to the clasping action of the pinch of the custom wrist of the RoSS input device.

Figure 15A:
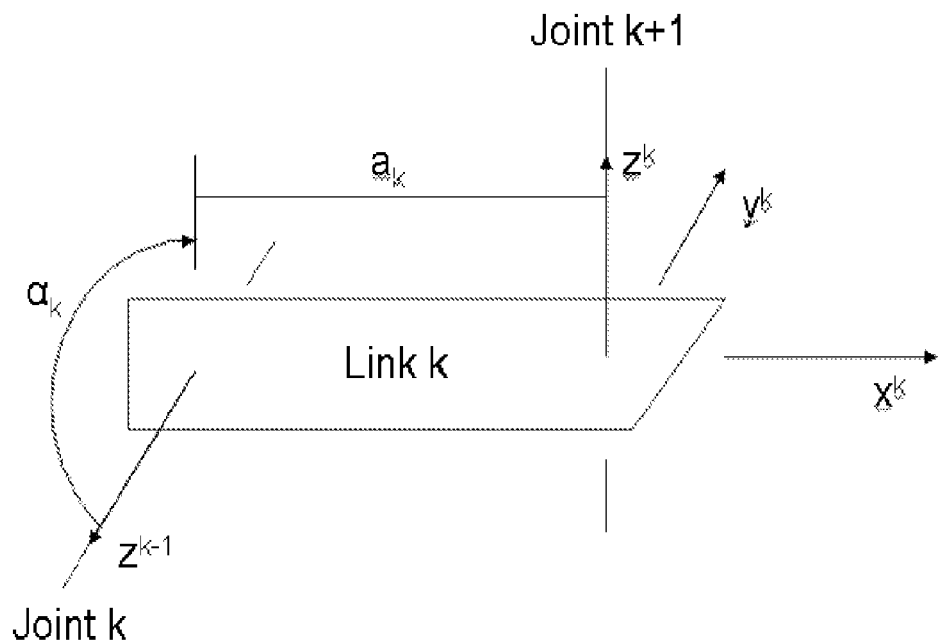
FIG. 15A is a diagram showing DH parameters.
Figure 15B:
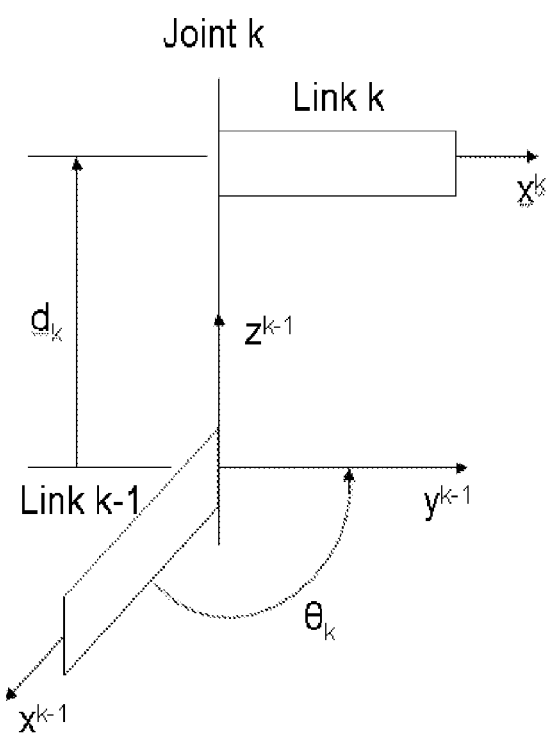
FIG. 15B is a diagram showing more DH parameters.

Modified Denavit-Hartenberg ("DH") notation was used to kinematically model the devices. In order to achieve the above mapping, the DH parameters were calculated for the DVSS master and RoSS input devices. It is a systematic notation for assigning orthonormal coordinate frames to the joints. The following steps were used to assign coordinate frames to the joints of the devices:

(1) Assign a coordinate frame $L_0$ to the DVSS base;
(2) Align $z_k$ with the axis of joint k+1;
(3) Locate the origin of $L_k$ at the intersection of $z_k$ and $z_{k-1}$. When there is no intersection, use the intersection of $z_k$ with a common normal between $z_k$ and $z_{k-1}$;
(4) Select $x_k$ to be orthogonal to $z_k$ and $z_{k-1}$. If $z_k$ and $z_{k-1}$ are parallel, point $x_k$ away from $z_{k-1}$; and
(5) Select $y_k$ to form a right handed orthonormal coordinate frame;

After assigning coordinate frames, the DH parameters may be calculated using the following conventions (see FIGS. 15A and 15B):

(1) $\theta_k$ is the angle of rotation from $x_{k-1}$ to $x_k$ measured about $z_{k-1}$;
(2) $d_k$ is the distance measured along $z_{k-1}$;
(3) $a_k$ is the distance measured along $x_k$; and
(4) $\alpha_k$ is the angle of rotation from $z_{k-1}$ to $z_k$ about $x_k$.

Each homogeneous transformation T may be represented as a product of four basic transformations associated with joints i and j (l-link length, α-link twist, d-link offset, and θ-joint angle) and I is a 4×4 identity matrix. The position and orientation of the end-effector is denoted by a position vector P and the 3×3 rotation matrix R. Based on the above DH parameters, a homogeneous transformation matrix is constructed which maps frame i coordinates into i−1 coordinates as follows:

$$T_{i-1}^i = \begin{bmatrix} \cos\theta_i & -\sin\alpha_i\cos\theta_i & \sin\alpha_i\sin\theta_i & a_i\cos\theta_i \\ \sin\theta_i & -\cos\alpha_i\cos\theta_i & \sin\alpha_i\cos\theta_i & a_i\sin\theta_i \\ 0 & \sin\alpha_i & \cos\alpha_i & d_i \\ 0 & 0 & 0 & 1 \end{bmatrix} \quad (1)$$

$$T_{i-1}^i = \begin{bmatrix} R & P \\ 0\ 0\ 0 & 1 \end{bmatrix} \quad (2)$$

After calculating the homogeneous transformation matrix for each link, the composite transformation matrix is calculated. This matrix maps the tool coordinates to the base coordinates. This yields the transformation matrix as:

$$T_{base}^{tool} = T_{base}^{wrist} \times T_{wrist}^{tool} \quad (3)$$

This final composite transformation matrix is calculated with respect to the base frame. The DH parameters for the DVSS master are shown in Table 1.

TABLE 1

DH Parameters of DVSS master

| Link | Parameters | θ | d | a | A |
|---|---|---|---|---|---|
| 1 | $\theta_1$ | $\theta_1$ | $d_1$ | 0 | −pi/2 |
| 2 | $\theta_2$ | $\theta_2$ | 0 | $L_2$ | 0 |
| 3 | $\theta_3$ | $\theta_3$ | 0 | $L_3$ | −pi/2 |
| 4 | $\theta_4$ | $\theta_4$ | $d_4$ | 0 | pi/2 |
| 5 | $\theta_5$ | $\theta_5$ | $d_5$ | 0 | −pi/2 |
| 6 | $\theta_6$ | $\theta_6$ | $d_6$ | 0 | pi/2 |

The DH parameters for the RoSS console are shown in Table 2.

TABLE 2

DH Parameters of RoSS Console

| Link | Parameters | θ | d | a | α |
|---|---|---|---|---|---|
| 1 | $\theta_1$ | $\theta_1$ | $d_1$ | 0 | $-\pi/2$ |
| 2 | $\theta_2$ | $\theta_2$ | 0 | $L_2$ | 0 |
| 3 | $\theta_3$ | $\theta_3$ | 0 | 0 | $-\pi/2$ |
| 4 | $\theta_4$ | $\theta_4$ | $d_4$ | 0 | $\pi/2$ |
| 5 | $\theta_5$ | $\theta_5$ | 0 | 0 | $-\pi/2$ |
| 6 | $\theta_6$ | $\theta_6$ | $d_6$ | 0 | $\pi/2$ |

Based on these DH parameters, the individual transformation matrix for each link may be calculated and the composite transformation matrix may be constructed after multiplying each of the individual transformation matrices as follows $$T_0^6 = T_0^1 \times R_1^2 \times R_2^3 \times T_3^4 \times T_4^5 \times T_5^6 \qquad (4)$$

To find the overall workspaces of the RoSS input device and DVSS input device, the range of angles of all the joints is found.

The range of each of the joint angles of RoSS input device is:

Joint 1: $-1.45 < \theta_1 < 1.05$ (radians)
Joint 2: $0.0 < \theta_2 < 1.727$ (radians)
Joint 3: $1.0 < \theta_3 < 2.1$ (radians)
Joint 4: $0.0 < \theta_4 < 4.71$ (radians)
Joint 5: $0.0 < \theta_5 < 3.0$ (radians)
Joint 6: $0.0 < \theta_6 < 4.71$ (radians)

The range of each of the joint angles of DVSS input device is:

Joint 1: $-0.53 < \theta_1 < 1.57$ (radians)
Joint 2: $0.265 < \theta_2 < 0.785$ (radians)
Joint 3: $0.0 < \theta_3 < 1.03$ (radians)
Joint 4: $-3.14 < \theta_4 < 1.57$ (radians)
Joint 5: $-1.57 < \theta_5 < 3.14$ (radians)
Joint 6: $-0.707 < \theta_6 < 0.707$ (radians)

Each of the joint angles is varied incrementally to yield the end-effector positions in the workspace. The end-effector position matrix is homogenized by adding a fourth column to the x, y and z columns. The workspace positions for both the RoSS and DVSS input devices are calculated. The 4×4 transformation matrix between the two workspaces is calculated by:

$$T = \text{pinv}(P_O) * P_M \qquad (5)$$

where: $P_O$ is the set of homogenized positions for RoSS input device; and $P_M$ is the set of homogenized positions for DVSS input device.

Since the end-effector encoder position values from the RoSS input device were spatially transformed to the calculated position values of RoSS input device from DH notation, these positions may either be transformed to the RoSS workspace or transformed to the DVSS master workspace. Therefore, a set of device positions consisting of a large number of 3D spatial position values (9261 in number) and the end effector positions are homogenized by adding a fourth column to x, y and z columns. Then the 4×4 transformation matrix was found between the two workspaces.

Inverse Kinematics Mapping Example

Inverse kinematics may be used to find a set of joint configurations of an articulated structure based upon a desirable end-effector location. Inverse kinematics was used to determine a set of joint angles in an articulated structure based upon the position (or motion) of the surgical tool in the video. This results in multiple joint angle solutions and infinite solutions at singularities. It may be generally used in software to control the joints. Control software should be able to perform the necessary calculations in near real time.

The mathematical representation of the inverse kinematics technique is defined as $$\theta = f^{-1}(X) \qquad (8)$$

Inverse kinematics may be implemented based upon the Jacobian technique. This technique incrementally changes joint orientations from a stable starting position towards a joint configuration that will result in the end-effector being located at the desired position in absolute space (corresponding to the location of the surgical tool in the video). The amount of incremental change on each iteration is defined by the relationship between the partial derivatives of the joint angles, θ, and the difference between the current location of the end-effector, X, and the desired position, $X_d$. The link between these two sets of parameters leads to the system Jacobian, J. This is a matrix that has dimensionality (m×n) where m is the spatial dimensional of X and n is the size of the joint orientation set, q.

$$X = f(\theta) \qquad (9)$$

The Jacobian is derived from Equation 9 as follows. Taking partial derivatives of Equation 9:

$$dX = J(\theta)d\theta \qquad (10)$$

Where:

$$J_{ij} = \frac{\partial f_i}{\partial \theta_j} \qquad (11)$$

Rewriting Equation 10 in a form similar to inverse kinematics (Equation 9), results in Equation 12. This form of the problem transforms the under-defined system into a linear one that can be solved using iterative steps.

$$d\theta = J^{-1}dX \qquad (12)$$

The problem now is that Equation 12 requires the inversion of the Jacobian matrix. However because of the under-defined problem that the inverse kinematics technique suffers from, the Jacobian is very rarely square. Therefore, the right-hand generalized pseudo-inverse may be used to overcome the non-square matrix problem, as given in equation 14.

Generating the pseudo-inverse of the Jacobian in this way can lead to inaccuracies in the resulting inverse that need to be reduced. Any inaccuracies of the inverse Jacobian can be detected by multiplying it with the original Jacobian then subtracting the result from the identity matrix. A magnitude error can be determined by taking the second norm of the resulting matrix multiplied by dP, as outlined in Equation 15. If the error proves too big then dP can be decreased until the error falls within an acceptable limit.

An overview of the algorithm used to implement an iterative inverse kinematics solution is as follows:

(1) Calculate the difference between the goal position and the actual position of the end-effector.

$$dP = X_g - X_p \qquad (13)$$

(2) Calculate the Jacobian matrix using the current joint angles.

$$J_{ij} = \frac{\partial P_i}{\partial \theta_j} \quad (14)$$

(3) Calculate the pseudo-inverse of the Jacobian.

$$J^{-1} = J^T(JJ^T)^{-1} \quad (15)$$

(4) Determine the error of the pseudo-inverse error:

$$\text{error} = \|I - (JJ^{-1})dP\| \quad (16)$$

(5) If error>e then dP=dP/2 restart at step (4)
(6) Calculate the updated values for the joint orientations and use these as the new current values. Check the bounds for theta values.

$$\theta = \begin{cases} lowerbound & \text{if } \theta + J^{-1}dP < lowerbound \\ upperbound & \text{if } \theta + J^{-1}dP > upperbound \\ \theta + J^{-1}dP & \text{if otherwise} \end{cases} \quad (17)$$

(7) Using forward kinematics determine whether the new joint orientations position the end-effector close enough to the desired absolute location. If the solution is adequate then terminate the algorithm otherwise go back to step (1).

The time to complete the Inverse Kinematics algorithm for a given end-effector is an unknown quantity due to an arbitrary number of iterations required. However, the time to complete a single iteration is constant with respect to the dimensionality of X and θ which is unchanged under a complete execution of the algorithm. Therefore by placing an upper limit on the number of iterations we can set a maximum time boundary for the algorithm to return in. If the solver reaches the limit then the algorithm returns the closest result it has seen.

Automated Tool Position Determination
Example Tracking Techniques

Two techniques for locating targets in video images are shown in detail as exemplary embodiments of the present invention. However, the present invention should not be limited by these examples.

"Target Representation and Localization" techniques may be viewed as bottom-up processes. These methods give a variety of tools for identifying the moving object. Locating and tracking the target object successfully is dependent on the algorithm. For example, using blob tracking is useful for identifying human movement because a person's profile changes dynamically. Typically the computational complexity for these algorithms is low.

"Filtering and Data Association" techniques are generally top-down processes, which involve incorporating prior information about the scene or object, addressing object dynamics, and evaluation of different hypotheses. These methods allow the tracking of complex objects along with more complex object interaction like tracking objects moving behind obstructions. The computational complexity for these algorithms is usually higher.

Filtering and Data Association Technique Example

The images (frames) which make up the video may be enhanced to cause the at least one surgical tool to better stand out from the background of the image. In some embodiments, the background of the image will be the surgical environment—tissues and other structures of the patient. Various image processing options are discussed below, including reference to a specific example (selection of image processing steps). The options and specific example are intended to be non-limiting. Other image processing techniques are known in the art and are within the scope of the present invention. In a method 100 of the present invention, one or more filters may be applied 115 to the frames of the video.

Reference is made to a specific example, where two needle tools are tracked. Each needle tool comprises a long shaft, having a base, and a wrist joint. The bases of the shafts are allowed to rotate freely. The video of this example is a stereoscopic video produced using two cameras slightly offset with respect to each other to produce set of images of the same scene from different angles. This stereoscopic video can be used to create a three-dimensional video of the MIS. The objective of this example was to track two surgical tools captured by two separate video cameras and find the locations of the tools. The following assumptions were made:

1. the tools may be described by features (e.g., color, number, length, etc.) which are known prior to analysis; and
2. the tools are the only objects which can be defined using straight lines.

Extract Images from Video Input

Figure 3:
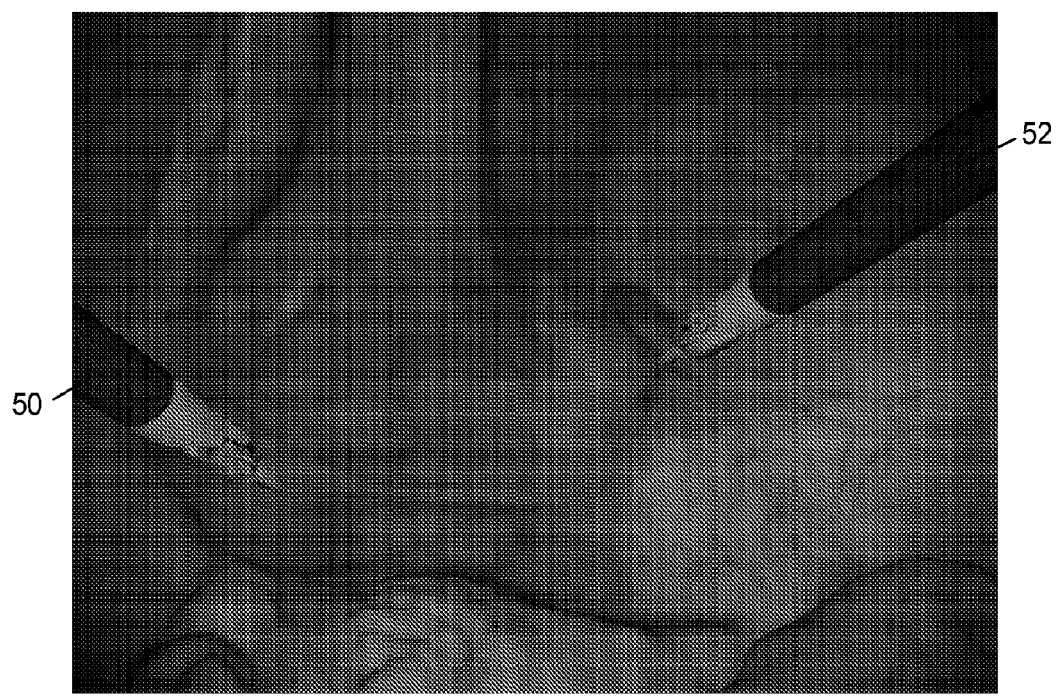
FIG. 3 is an image from a video of an MIS.

Videos are generally comprised of a plurality of still images taken over time. The video used by the present invention may first be parsed to extract the separate images (frames) from the video. In the present example, the openCV application programming interface ("API") was used to extract image frames from the video of tool motion captured by camera. Each of these images served as input for further image processing. In the present example, the video—and therefore each frame of the video—measured 720×486 pixels (a common, wide-screen format). FIG. 3 is a sample image showing two surgical tools 50, 52 and an internal portion of an abdomen of a patient. A method 100 of the present invention may comprise the step of extracting a frame from video, extracting each frame from the video successively, and/or extracting all frames from the video.

Retrieving Physical Characteristic Data

The properties (physical characteristics) of the tools were captured and retrieved for use during image processing (e.g., color (RGB format), length, width, etc.). The color information, if provided was used during thresholding (described below), while other properties were used during feature detection (described below). In the present example, the length of the tool shaft in a 720×486 resolution image is approximately 200 pixels.

Pre-Processing—Noise/Clutter

It may be beneficial to filter the image to reduce noise and clutter within the image. Noise can be defined as random errors in pixel brightness values, while clutter can be defined non-useful image components (patient tissue may involve a great deal of clutter). Both noise and clutter can be reduced by applying filters. For example, blurring (averaging) filters, Gaussian blur filters, and/or median filters may be applied to the image. Gaussian blur filters will remove high-frequencies from an image and may thus be considered to be low-pass filters. Median filters replace pixels with the median value of neighboring pixels according to rules which vary by filtering algorithm. Median filters reduce "impulse noise" considerably without excessive blurring of edges in the image. Both median and Gaussian filters are suited to noise/clutter reduction, however, median filters are better suited to preserving edges within an image. After considerable testing using different filters, the median filter technique was used for the present example.

Pre-Processing—Thresholding

In a method of the present invention, thresholding may be used to provide a binary image (or other quantized image). Thresholding is an image processing technique where pixels are assigned a new value based on its particular characteristic compared to a threshold value of that characteristic. For example, thresholding may assign a new value to a pixel based on the brightness of that pixel. In another examples, thresholding may assign a new value to a pixel based on its color (using an appropriate color space—e.g., red, green, blue ("RGB"), hue-saturation-luminosity ("HSL"), etc.). Thresholding is useful for producing binary images—images that have only two possible values for each pixel. In the present example, a binary image is well-suited for other steps, including edge detection.

Figure 4A:
FIG. 4A is the image of FIG. 3 after processing by gray level thresholding.
Figure 4B:
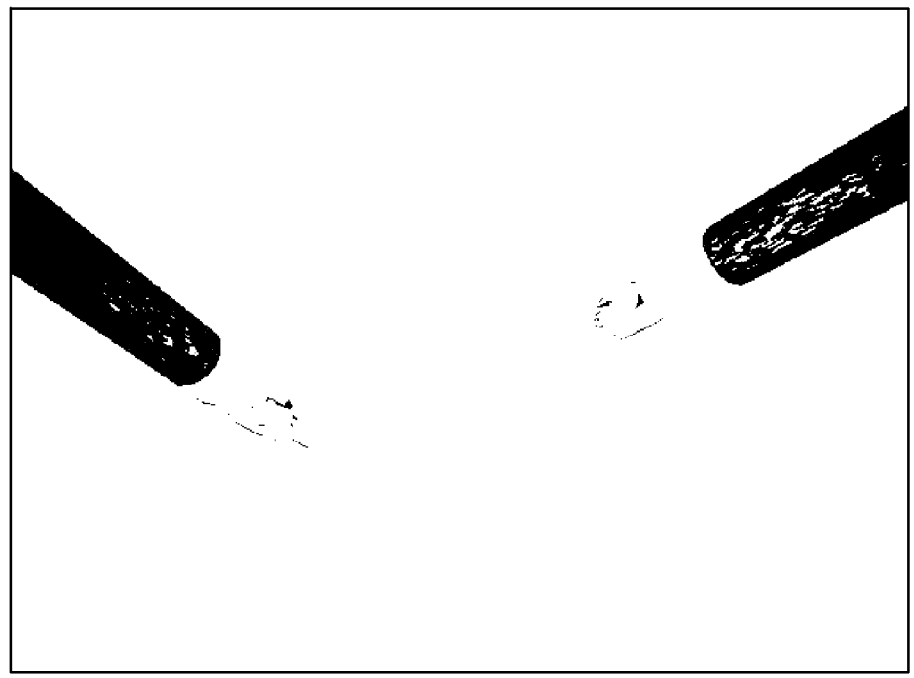
FIG. 4B is the image of FIG. 3 after processing by HSL thresholding.

In the present example, thresholding based on HSL value (FIG. 4B) proved to yield better results than brightness thresholding techniques (FIG. 4A). HSL thresholding is a useful method for achieving desirable results from color thresholding where an image was converted from another color space. A color space like HSL can result in a better-designed filter, as it allows the characteristics of color hue, saturation, and luminosity (brightness) to be addressed separately, i.e. allowing a more forgiving filter for luminosity if a large range of input brightness is anticipated. For certain data sets, HSL thresholding may render the noise/clutter reduction operation (described above) unnecessary. The output from thresholding based on HSL values provides a binary image with very few unwanted pixels.

Pre-Processing—Morphological Operations

A method of the present invention may use a morphological function to reduce the number of noise pixels and/or resolve discontinuities in the image. Erosion and dilation are methods of morphological operations which can be used independently or together to produce desired outputs. Erode will reduce the size of blobs of pixels in the image, and Dilate will increase the size of such blobs, either adding or subtracting pixels (their brightness value) from around the perimeter of the blob. For vision processing, these functions are useful because they can either accentuate or eliminate smaller blocks of pixels in the image. In addition, first applying Dilate and then Erode (called "Closing") can cause adjacent blobs of pixels to become connected, while application in the reverse order (called "Opening") can cause them to disconnect, without changing the general size of the blobs. Such morphological operations are suited to further reduce the number of noise pixels and/or reduce discontinuities in the image. For example, a few isolated pixels may be dilated to produce a uniform line. These operations operate best on binary images, although non-binary images may also be used. In morphological operations, a structural element (of a particular shape) is used to "probe" an image and reduce (erode) or expand (dilate) the shape of a structure in the image.

Erosion may be expressed as:

$$\text{Erosion}(A, B) = \bigcup_{b \in B} A_{-b}$$

where A is the binary image and B is the structural element. When the structural element B has a center, the erosion of binary image A may be understood as the set of points reached by the center of B as B is moved within structures of the binary image A.

Dilation may be expressed as:

$$\text{Erosion}(A, B) = \bigcup_{b \in B} A.$$

Where the structural element B has a center, the dilation of binary image A may be understood as the set of points reached by the periphery of B as the center of B is moved along structures of the binary image A.

Figure 5A:
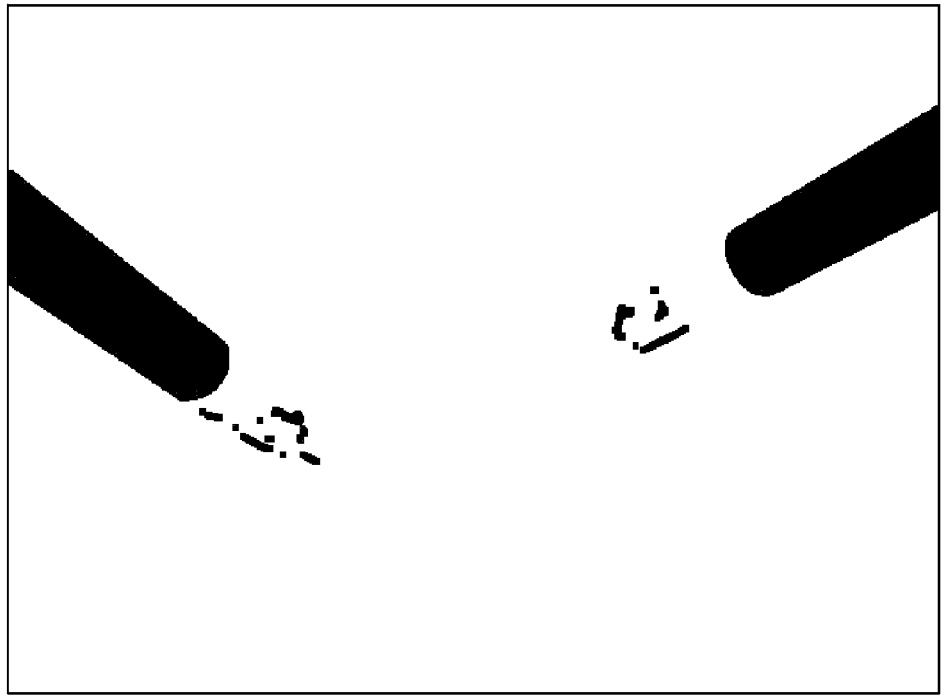
FIG. 5A is the image of FIG. 4B after processing by erosion.
Figure 5B:
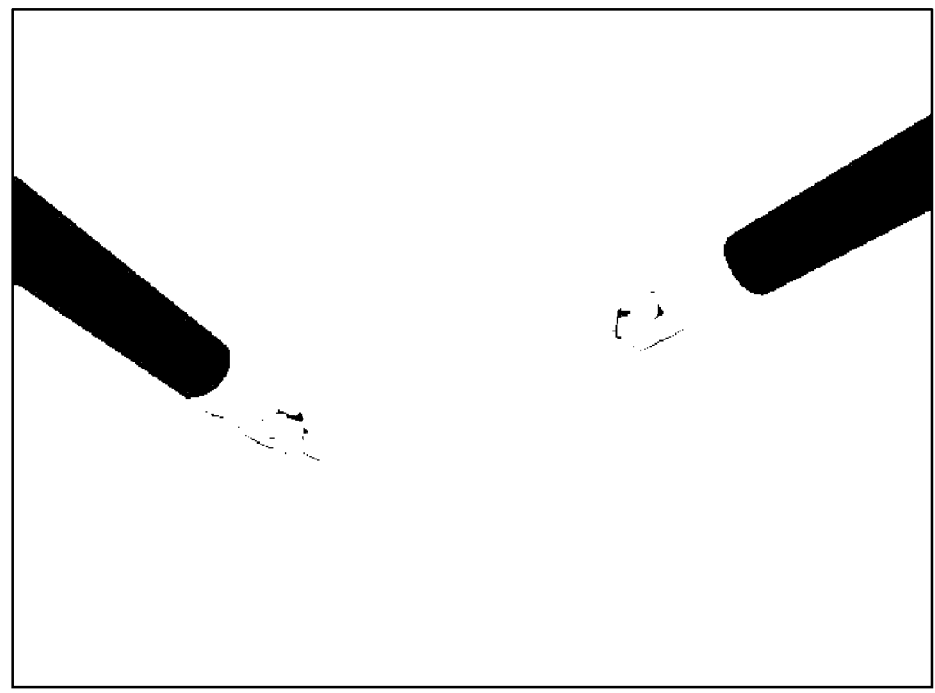
FIG. 5B is the image of FIG. 5A after processing by dilation.

In the present example, the image was first eroded and then dilated which connected disconnected pixels (see FIG. 5A (erosion) and FIG. 5B (dilation)).

Pre-Processing—Edge Detection

A method of the present invention may apply an edge detection function to the frames of the video. Edge detection involves scanning the image for places of sudden change (in color, brightness, or other appropriate characteristic), which usually denotes a division or an "edge." There are several methods that can be used, each performing better on different types of images. There are edge detection algorithms which use first derivative (usually search-based methods) and second order derivative (usually zero-crossing based methods) information. For example, algorithms using Sobel operators or Laplacian operators may be used to detect gradient variation, and thus edges.

Figure 6:
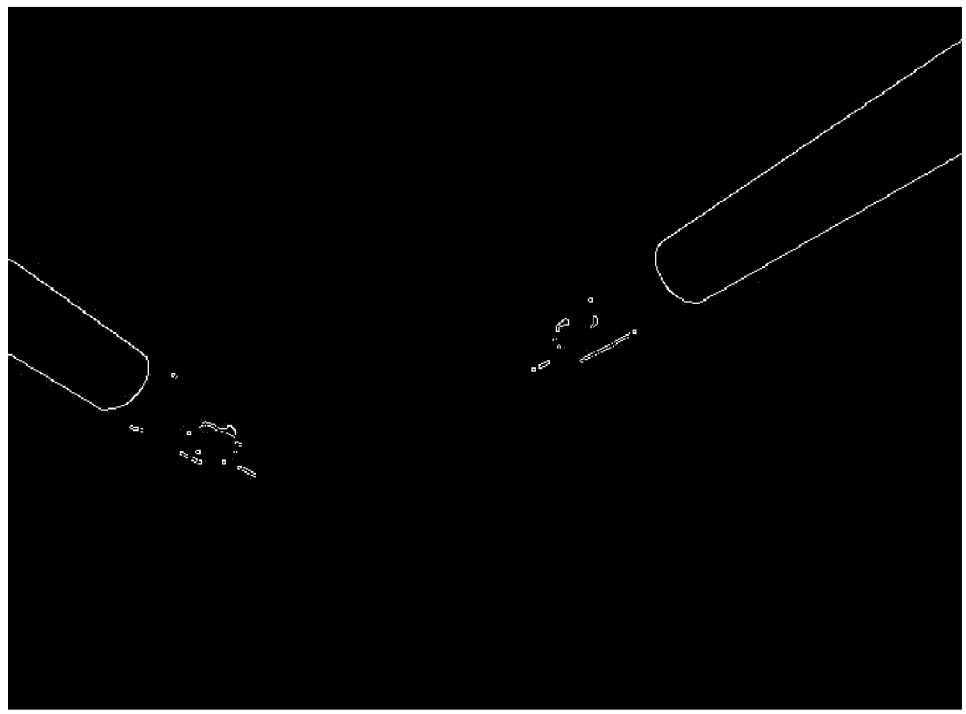
FIG. 6 is the image of FIG. 5B after processing by edge detection.

In the present example, the "Canny" edge detection algorithm was used. The Canny algorithm is a type of zero-crossing algorithm, meaning it checks the zero crossing of second order derivative. The Canny algorithm applies thresholding to the obtained output by applying a Sobel operator and creates a binary image comprising all possible edges in the image. Parameters may be selected in the function to refine the size of the edges. The sample image obtained from Canny Algorithm is shown in FIG. 6.

Pre-Processing—Hough Transform

A method of the present invention may use a Hough transform to determine a set of tool edge candidates from among a set of edges. A Hough transform is a technique for extracting features (in the present case, edges) from an image. Hough space is an image space that describes the probability that certain shapes exist at locations in an image. The OpenCV API contains two functions that make use of Hough transforms to identify instances of straight lines (cvHoughLines2) or circles (cvHoughCircles) within an image. Both functions require the input image to be grayscale/binary (single channel). The line function returns an array containing all possible lines, which is used for feature detection.

Figure 7:
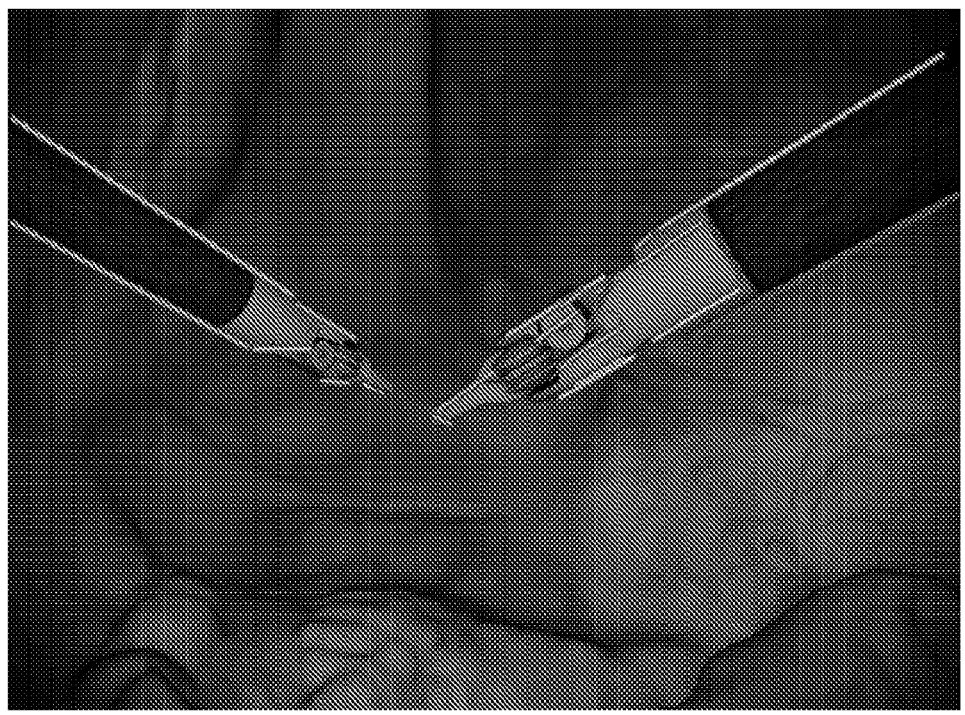
FIG. 7 is the image of FIG. 6 after further processing.

In the present example, cvHoughLines2 was used to determine the locations of lines existing in the image of FIG. 7. The resulting array may be considered a set of tool candidates. The set of tool candidates was used to recognize the tools based on the tool characteristics (physical characteristic data).

Feature Detection and Object Recognition

Figure 8:
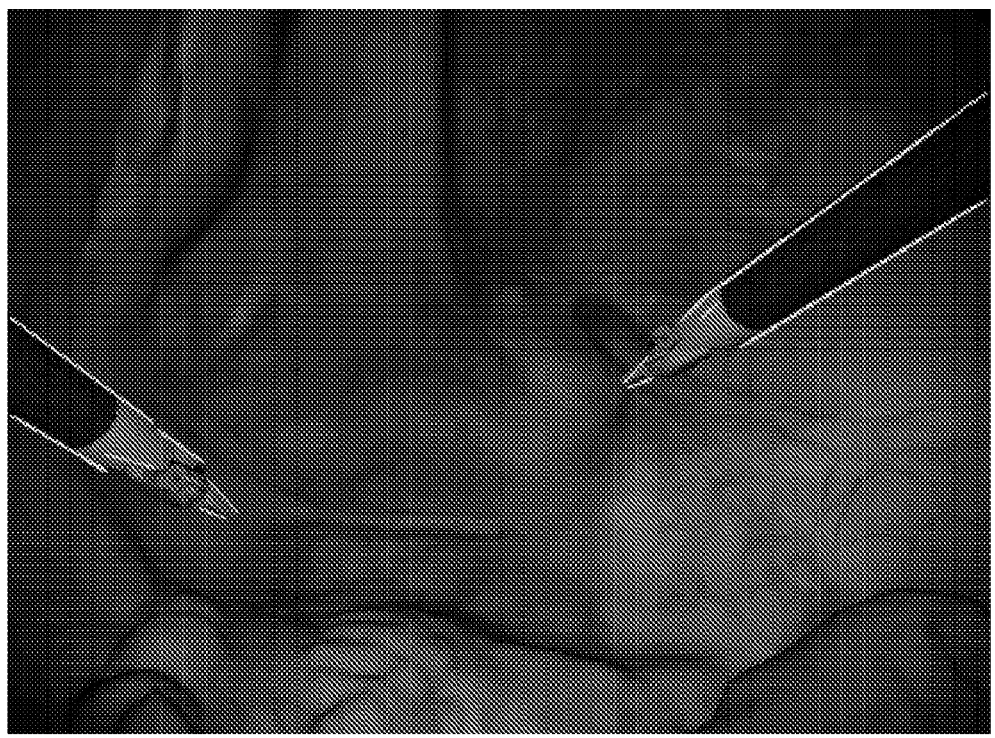
FIG. 8 is the image of FIG. 7 after using feature recognition techniques.

A method of the present invention may use the physical characteristic data to determine at least one tool edge from among the tool edge candidates. In the present example, after the set of tool candidates was determined from the image using the aforementioned techniques (or other appropriate techniques), the lines defining the surgical tools may be identified from among the set. The physical characteristic data was used. For example, the length of the tool was used to determine lines in the set of candidates of an suitable length. Also, the tool width was used to determine lines which were the proper distance apart. Also, the slope of the proper lines could be determined since the shaft of the tool would be identified by two substantially parallel lines. Using this domain knowledge in the form of standard IF-ELSE conditions with generic image analysis data, each tool shaft was identified in the image (see FIG. 8).

Tool Location Determination

End points of the identified lines which define the edges of the tools were used for extracting the 2-D coordinates of the tools. Further, using features of the tools, the tool's two-dimensional orientation was determined. By analyzing two corresponding images of the stereoscopic video (taken simultaneously from two different cameras), the three-dimensional location of tool tips and orientation of tools were determined.

Target Representation and Localization Technique Example

This technique uses the concept of "optical flow" to track the apparent motion of objects (in the present case, the surgical tools) in the frames of a video. The optical flow techniques shown in this example, use either the Horn-Schunck method or the Lucas-Kanade method. Other methods are possible and within the scope of this disclosure.

At a high level, the following constraint equation can be used to compute the optical flow between two images:

$$I_x u + I_y v + I_t = 0$$

In this equation, $I_x$, $I_y$, and $I_t$ are the intensity of a pixel at location x, y, t, u is the horizontal optical flow, and v is the vertical optical flow. This equation is under-constrained; however, there are several methods to solve for u and v:

Horn-Schunck Method

By assuming that the optical flow is smooth over the entire image, the Horn-Schunck method computes an estimate of the velocity field that minimizes the global energy functional equation:

$$E = \int\int (I_x u + I_y v + I_t)^2 dxdy + \alpha + \int\int \left\{\left(\frac{\partial u}{\partial x}\right)^2 + \left(\frac{\partial u}{\partial y}\right)^2 + \left(\frac{\partial v}{\partial x}\right)^2 + \left(\frac{\partial v}{\partial y}\right)^2\right\} dxdy$$

The Horn-Schunck method minimizes the previous equation to obtain the velocity field, [u v], for each pixel in the image, which is given by the following equations:

$$u_{x,y}^{k+1} = u_{x,y}^k - \frac{I_x [I_x \bar{u}_{x,y}^k + I_y \bar{v}_{x,y}^k + I_t]}{\alpha^2 + I_x^2 + I_y^2}$$

$$v_{x,y}^{k+1} = v_{x,y}^k - \frac{I_y [I_x \bar{u}_{x,y}^k + I_y \bar{v}_{x,y}^k + I_t]}{\alpha^2 + I_x^2 + I_y^2}$$

In this equation, $$[u_{x,y}^k \; v_{x,y}^k]$$

is the velocity estimate for the pixel at (x,y). For k=0, the initial velocity is 0.

A method according to an embodiment of the present invention using Horn-Schunck solves for u and v by computing and using the Sobel convolution kernel and its transposed form for each pixel in the first image. Then, compute between frames 1 and 2 using the kernel. Assume the previous velocity to be 0, and compute the average velocity for each pixel using as a convolution kernel. Finally, iteratively solve for u and v.

Lucas-Kanade Method:

To solve the optical flow constraint equation for u and v, the Lucas-Kanade method divides the original image into smaller sections and assumes a constant velocity in each section. Then, the method performs a weighted least-square fit of the optical flow constraint equation to a constant model in each section by minimizing the following equation:

$$\sum_{x \in \Omega} W^2 [I_x u + I_y v + I_t]^2$$

Here, W is a window function that emphasizes the constraints at the center of each section. The solution to the minimization problem is given by the following equation:

$$\begin{bmatrix} \sum W^2 I_x^2 & \sum W^2 I_x I_y \\ \sum W^2 I_y I_x & \sum W^2 I_y^2 \end{bmatrix} \begin{bmatrix} u \\ v \end{bmatrix} = -\begin{bmatrix} \sum W^2 I_x I_t \\ \sum W^2 I_y I_t \end{bmatrix}$$

The block computes using a difference filter or a derivative of a Gaussian filter (below)

Difference Filter:

Compute and use the kernel and its transposed form. For fixed-point data types, the kernel values are signed, fixed-point values with a word length equal to 16 and fraction length equal to 15.

1. Compute between images 1 and 2 using the kernel.
2. Smooth the gradient components and use a separable and isotropic 5-by-5 element kernel. For fixed-point data types, the kernel values are unsigned, fixed-point values with word length equal to 8 and fraction length equal to 7.
3. Solve the 2-by-2 linear equations for each pixel by:

If $$A = \begin{bmatrix} a & b \\ b & c \end{bmatrix} = \begin{bmatrix} \sum W^2 I_x^2 & \sum W^2 I_x I_y \\ \sum W^2 I_y I_x & \sum W^2 I_y^2 \end{bmatrix},$$

then the eigenvalues of A are $$\lambda_i = \frac{a+c}{2} \pm \frac{\sqrt{4b^2 + (a-c)^2}}{2};$$

In the fixed-point diagrams, $$P = \frac{a+c}{2}, \; Q = \frac{\sqrt{4b^2 + (a-c)^2}}{2}$$

4. When the eigenvalues are computed, they are compared to a threshold (noise reduction) parameter that is user selectable. Selection is made to eliminate the effect of small movements between frames—the higher the threshold value, the less small movements impact the optical flow calculation. The results fall into one of the following cases:

Case 1: A is nonsingular, so the block solves the system of equations using Cramer's rule.

Case 2: A is singular (noninvertible), so the block normalizes the gradient flow to calculate u and v.

Case 3: The optical flow, u and v, is 0.

Derivative of Gaussian:

Compute and use a Gaussian filter to perform temporal filtering. Specific temporal filter characteristics such as the standard deviation and number of filter coefficients are selected as appropriate.

Compute and use a Gaussian filter and the derivative of a Gaussian filter to smooth the image using spatial filtering. Specific standard deviation and length of the image-smoothing filter are selected as appropriate.

1. Compute between images 1 and 2 using the following steps:

Use the derivative of a Gaussian filter to perform temporal filtering. Specific temporal filter characteristics such as the standard deviation and number of filter coefficients are selected as appropriate.

a. Use a filter to perform spatial filtering on the output of the temporal Filter.

2. Smooth the gradient components and using a gradient smoothing filter. The standard deviation and the number of filter coefficients for the gradient smoothing filter are selected as appropriate.

3. Solve the 2-by-2 linear equations for each pixel using the following method:

If $$A = \begin{bmatrix} a & b \\ b & c \end{bmatrix} = \begin{bmatrix} \sum W^2 I_x^2 & \sum W^2 I_x I_y \\ \sum W^2 I_y I_x & \sum W^2 I_y^2 \end{bmatrix},$$

then the eigenvalues of A are $$\lambda_i = \frac{a+c}{2} \pm \frac{\sqrt{4b^2 + (a-c)^2}}{2};$$

4. When the eigenvalues are computed, they are compared to a threshold (noise reduction) parameter that is user selectable. Selection is made to eliminate the effect of small movements between frames—the higher the threshold value, the less small movements impact the optical flow calculation. The results fall into one of the following cases:

Case 1: A is nonsingular, so the block solves the system of equations using Cramer's rule.

Case 2: A is singular (noninvertible), so the block normalizes the gradient flow to calculate u and v.

Case 3: The optical flow, u and v, is 0.

Software Interface

Figure 9A:
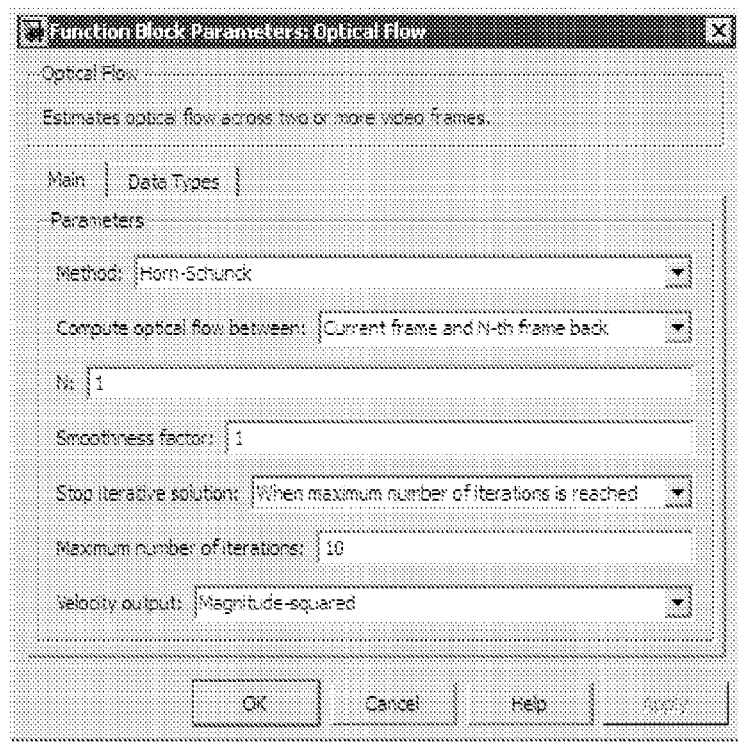
FIG. 9A is a dialog box showing user-selectable parameters for image processing.
Figure 9B:
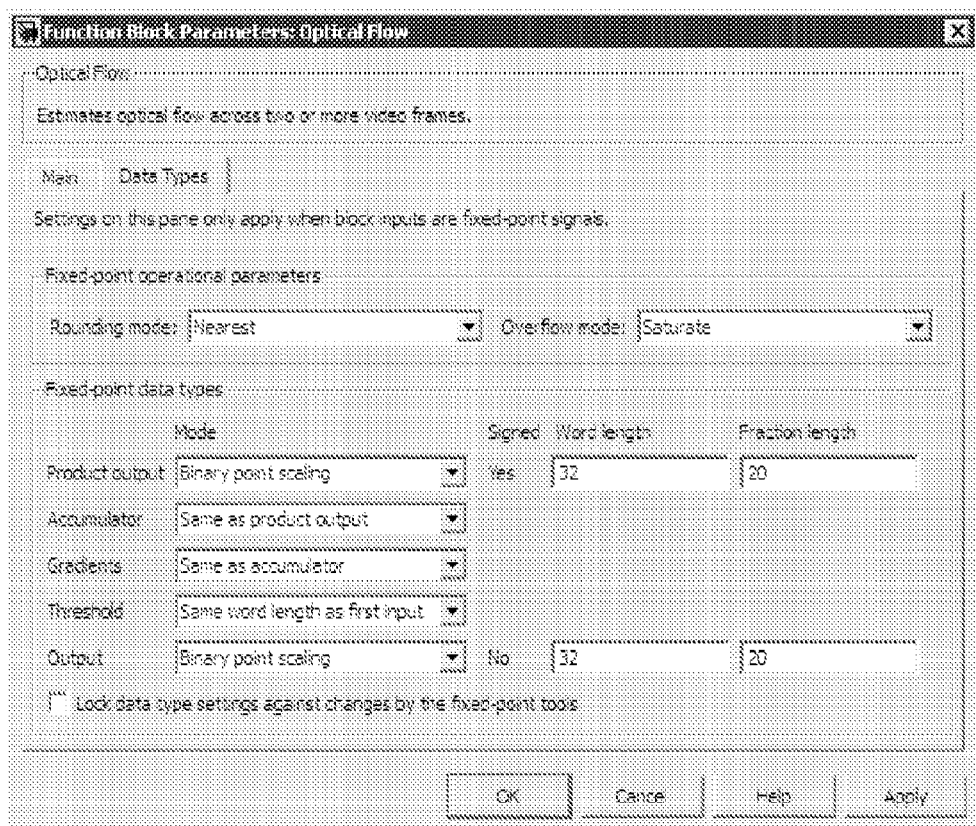
FIG. 9B is another dialog box showing additional user-selectable parameters for image processing.
Figure 10:
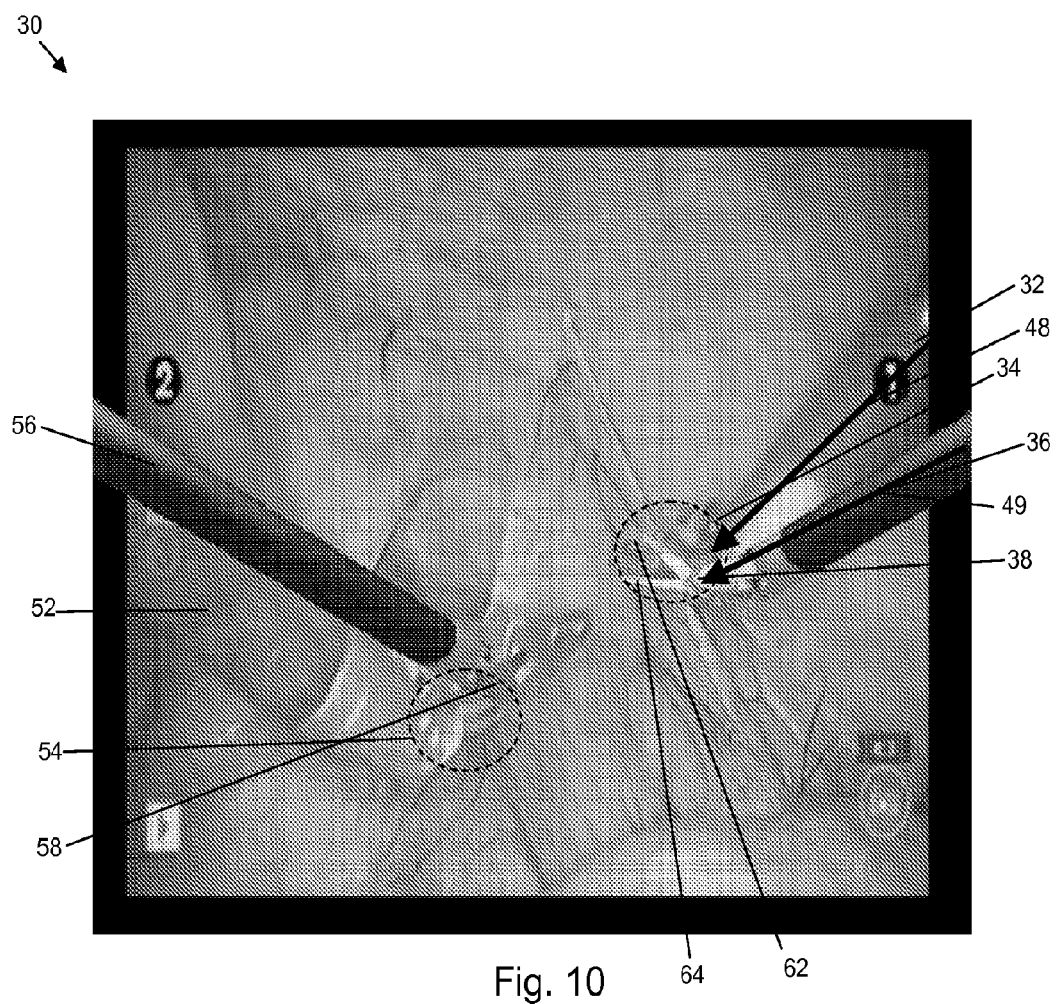
FIG. 10 is an image from a video of an MIS and having virtual tools superimposed for training a trainee.

In a non-limiting example, the aforementioned optical flow techniques were implemented in software. The main pane of the Optical Flow dialog box is shown in FIG. 9A, and the "Data Types" pane is shown in FIG. 9B. The main field parameters are described below.

Method:

Select the method the block uses to calculate the optical flow. The choices are "Horn-Schunck" or "Lucas-Kanade."

Compute Optical Flow Between:

Select two images to compute the optical flow between two images. Select "Current frame and N-th frame back" to compute the optical flow between two video frames that are N frames apart. This parameter is visible when the Method parameter is set to "Horn-Schunck" or the Method parameter is set to "Lucas-Kanade" and the Temporal gradient filter to "Difference filter [−1 1]."

N:

Enter a scalar value that represents the number of frames between the reference frame and the current frame. This parameter becomes available when the Compute optical flow between parameter is set to a selection requiring a value for N.

Smoothness Factor:

If the relative motion between the two images or video frames is large, enter a large positive scalar value. If the relative motion is small, enter a small positive scalar value. This parameter becomes available when the Method parameter is set to "Horn-Schunck."

Stop Iterative Solution:

Use this parameter to control when the block's iterative solution process stops. If the iteration should stop when the velocity difference is below a certain threshold value, select "when velocity difference falls below threshold." If the iteration should stop after a certain number of iterations, choose "when maximum number of iterations is reached." There is also an option for "whichever comes first." This parameter becomes available when the Method parameter is set to Horn-Schunck.

Maximum Number of Iterations:

Enter a scalar value that represents the maximum number of iterations the block should perform. This parameter is only visible if "when maximum number of iterations is reached" or "whichever comes first" is selected for the Step iterative solution parameter. This parameter becomes available when the Method parameter is set to "Horn-Schunck."

Velocity Difference Threshold:

Enter a scalar threshold value. This parameter is only visible if, for the Stop iterative solution parameter, "When velocity difference falls below threshold" or "Whichever comes first" is selected. This parameter becomes available when the Method parameter is set to "Horn-Schunck."

Velocity Output:

If "Magnitude-squared" is selected, the block outputs the optical flow matrix where each element is of the Magnitude-squared form. If "Horizontal and vertical components in complex form" is selected, the block outputs the optical flow matrix where each element is of the horizontal and vertical form.

Temporal Gradient Filter:

Specify whether the block solves for u and v using a "difference filter" or a "derivative of a Gaussian filter." This parameter becomes available when the Method parameter is set to "Lucas-Kanade."

Number of Frames to Buffer for Temporal Smoothing:

Use this parameter to specify the temporal filter characteristics such as the standard deviation and number of filter coefficients. This parameter becomes available when the temporal gradient filter parameter is set to "Derivative of Gaussian."

Standard Deviation for Image Smoothing Filter:

Specify the standard deviation for the image-smoothing filter. This parameter becomes available when the temporal gradient filter parameter is set to "Derivative of Gaussian."

Standard Deviation for Gradient Smoothing Filter:

Specify the standard deviation for the gradient smoothing filter. This parameter becomes available when the temporal gradient filter parameter is set to "Derivative of Gaussian."

Discard Normal Flow Estimates when Constraint Equation is Ill Conditioned:

Select this check box if the block should set the motion vector to zero when the optical flow constraint equation is ill conditioned. This parameter becomes available when the temporal gradient filter parameter is set to "Derivative of Gaussian."

Output Image Corresponding to Motion Vectors (Accounts for Block Delay):

Select this check box if the block should output the image that corresponds to the motion vector being output by the block. This parameter becomes available when the temporal gradient filter parameter is set to "Derivative of Gaussian."

Threshold for Noise Reduction:

Enter a scalar value that determines the motion threshold between each image or video frame. The higher the number, the less small movements impact the optical flow calculation. This parameter becomes available when the Method parameter is set to "Lucas-Kanade."

The parameters on the Data Types dialog box become visible only when the "Lucas-Kanade" method is selected.

Rounding Mode:

Select the rounding mode for fixed-point operations.

Overflow Mode:

Select the overflow mode for fixed-point operations.

Product Output:

Use this parameter to specify how to designate the product output word and fraction lengths.

When "Binary point scaling" is selected, the word length and the fraction length of the product output in bits may be entered. When "Slope and bias scaling" is selected, the word length in bits and the slope of the product output may be entered. The bias of all signals in the Video and Image Processing Blockset blocks is 0.

Accumulator:

Use this parameter to specify how to designate this accumulator word and fraction lengths.

When "same as product output" is selected, these characteristics match those of the product output. When "Binary point scaling" is selected, the word length and the fraction length of the accumulator in bits may be entered. When "Slope and bias scaling" is selected, the word length in bits and the slope of the accumulator may be entered. The bias of all signals in the Video and Image Processing Block setblocks is 0.

Gradients:

Choose how to specify the word length and fraction length of the gradients data type. When "same as accumulator" is selected, these characteristics match those of the accumulator. When "same as product output" is selected, these characteristics match those of the product output. When "Binary point scaling" is selected, the word length and the fraction length of the quotient, in bits, may be entered. When "Slope and bias scaling" is selected, the word length in bits and the slope of the quotient may be entered. The bias of all signals in the Video and Image Processing Blockset blocks is 0.

Threshold:

Choose how to specify the word length and fraction length of the threshold data type: When "same word length as first input" is selected, the threshold word length matches that of the first input. When "Specify word length" is selected, enter the word length of the threshold data type. When "Binary point scaling" is selected, the word length and the fraction length of the threshold, in bits, may be entered. When "Slope and bias scaling" is selected, the word length in bits and the slope of the threshold may be entered. The bias of all signals in the Video and Image Processing Block set blocks is 0.

Combinations of Techniques

The above example techniques, and others, can be combined in ways which enhance the accuracy and/or lower the processing requirements of the automated tool tracking methods. For example, the video frames may be pre-processed to remove considerable detail before using optical flow techniques to identify the moving objects.

In an exemplary (non-limiting) embodiment of the present invention, the tool location is determined through a combination of these techniques. The video is received by the processor. The frames of the video are preprocessed by reducing the resolution of the video, removing noise and clutter by application of an appropriate filter, thresholding to further reduce the amount of information in the video, and eroding and dilating the objects in the video in order to further consolidate (i.e., simplify) the objects. Optical flow techniques are used on this pre-processed video to detect the movement (velocity) of the features of the video. The moving features are processed to determine regions of interest (i.e., blobs) and the centroids of the blobs are determined in each frame. This centroid is used as a proxy for the overall tool location. In the case of a stereoscopic video, the centroids from each image of a two-image frame are processed using, for example, a Kalman filter to determine the three-dimensional location of the centroid.

Although the present invention has been described with respect to one or more particular embodiments, it will be understood that other embodiments of the present invention may be made without departing from the spirit and scope of the present invention. There are numerous embodiments of the invention described herein including examples, all of which are intended to be non-limiting examples (whether explicitly described as non-limiting or not). Hence, the present invention is deemed limited only by the appended claims and the reasonable interpretation thereof.

What is claimed is:

1. A system for minimally-invasive surgery training utilizing a video, the video showing a first surgical tool, the first surgical tool controlled by a surgeon using a first tool controller, the system comprising:
   (a) a processor;
   (b) a display in communication with the processor;
   (c) a first interaction device in communication with the processor; and
   (d) wherein the processor is programmed to:
      (1) receive the video;
      (2) obtain tracking data, wherein the tracking data is synchronized to the video;
      (3) calculate motion of the first interaction device corresponding to the tracking data;
      (4) display the video on the display; and
      (5) cause the first interaction device to move according to the calculated motion; and
   wherein the processor obtains the tracking data by processing the video to calculate motion of the first surgical tool.

2. The system of claim 1, wherein the processor obtains the tracking data by receiving data corresponding to motion of the first tool controller, the motion caused by the surgeon.

3. The system of claim 1, wherein the first interaction device has an equal number of degrees of freedom as the first tool controller.

4. The system of claim 1, wherein the first interaction device has fewer degrees of freedom than the first tool controller.

5. The system of claim 1, wherein the first interaction device is a PHANTOM® Omni®.

6. The system of claim 1, wherein the processor causes the first interaction device to move by causing an affirmative movement of the first interaction device.

7. The system of claim 1, wherein the processor causes the first interaction device to move thereby guiding the hand of a user grasping the first interaction device.

8. The system of claim 1, further comprising a second interaction device in communication with the processor, and wherein the processor is further programmed to:
 (a) calculate motion of the second interaction device corresponding to the tracking data; and
 (b) cause the second interaction device to move according to the calculated motion of the second interaction device.

9. The system of claim 1, wherein the display is a stereoscopic display.

10. A computer-based method of minimally-invasive surgery training utilizing a video, the video showing a first surgical tool, the first surgical tool controlled by a surgeon using a first tool controller, the method comprising the steps of:
 (a) receiving the video;
 (b) obtaining tracking data, wherein the tracking data is synchronized to the video;
 (c) calculating motion of a first interaction device corresponding to the tracking data;
 (d) displaying the video on a display; and
 (e) causing the first interaction device to move according to the calculated motion; and
 wherein the tracking data is obtained by processing the video to calculate motion of the first surgical tool.

11. The system of claim 10, wherein the tracking data is obtained by receiving data corresponding to motion of the first tool controller, the motion caused by the surgeon.

12. The method of claim 10, wherein calculating motion of a first interaction device comprises using a predetermined transformation matrix.

13. A system for training a trainee to operate remotely operated equipment, the system utilizing a video showing the equipment from a point of view of an operator of the equipment, the equipment controlled by the operator using a first tool controller, the system comprising:
 (a) a processor;
 (b) a display in communication with the processor;
 (c) a first interaction device in communication with the processor; and
 (d) wherein the processor is programmed to:
  (1) receive the video;
  (2) obtain tracking data, wherein the tracking data is synchronized to the video;
  (3) calculate motion of the first interaction device corresponding to the tracking data;
  (4) display the video on the display; and
  (5) cause the first interaction device to move according to the calculated motion; and
 wherein the tracking data is obtained by processing the video to calculate motion of the equipment.

14. The system of claim 13, wherein the tracking data is obtained by receiving data corresponding to motion of the first tool controller, the motion caused by the operator.

15. The system of claim 13, further comprising one or more additional interaction devices.

16. The system of claim 15, wherein the number of interaction devices is equal to the number of tool controllers.

17. The system of claim 15, wherein the number of interaction devices is less than the number of tool controllers.

18. The system of claim 17, further comprising a switch for causing one of the interaction devices to simulate another of the tool controllers.

19. The system of claim 18, wherein the switch is a push-button, a throw switch, a lever, or a foot pedal.

\* \* \* \* \*